United States Patent
Satou

[11] Patent Number: 6,078,367
[45] Date of Patent: Jun. 20, 2000

[54] LIQUID CRYSTAL DISPLAY WITH SUB-PIXEL ELECTRODES, AND CONTROL CAPACITOR ELECTRODES FORMING CONTROL CAPACITORS

[75] Inventor: Takashi Satou, Nagano-ken, Japan

[73] Assignee: Seiko Epson Corporation, Tokyo, Japan

[21] Appl. No.: 08/793,089

[22] PCT Filed: Jun. 17, 1996

[86] PCT No.: PCT/JP96/01652

§ 371 Date: Mar. 27, 1997

§ 102(e) Date: Mar. 27, 1997

[87] PCT Pub. No.: WO97/00463

PCT Pub. Date: Jan. 3, 1997

[30] Foreign Application Priority Data

Jun. 16, 1995 [JP] Japan ..................... 7-174200

[51] Int. Cl.⁷ .................................................. G02F 1/136
[52] U.S. Cl. .................................. 349/46; 349/42
[58] Field of Search ........................... 349/42, 43, 46

[56] References Cited

U.S. PATENT DOCUMENTS

| | | | |
|---|---|---|---|
| 5,126,865 | 6/1992 | Sarma | 359/59 |
| 5,521,729 | 5/1996 | Ukai et al. | 359/59 |
| 5,668,613 | 9/1997 | Kim et al. | 349/42 |

FOREIGN PATENT DOCUMENTS

| | | |
|---|---|---|
| 3-122621 | 5/1991 | Japan . |
| 4-348323 | 12/1992 | Japan . |
| 5-107556 | 4/1993 | Japan . |
| 5-0142570 | 6/1993 | Japan . |
| 5-289108 | 11/1993 | Japan . |
| 6-102537 | 4/1994 | Japan . |
| 6-95144 | 4/1994 | Japan . |
| 6-148681 | 5/1994 | Japan . |
| 7-28091 | 1/1995 | Japan . |
| 7-325322 | 12/1995 | Japan . |

*Primary Examiner*—William L. Sikes
*Assistant Examiner*—Heidi L. Eisenhut
*Attorney, Agent, or Firm*—Oliff & Berridge, PLC

[57] ABSTRACT

A liquid crystal display element, a manufacturing method(s) thereof, and electronic devices (utilizing this element) which can improve, through a simple process, the visual angle characteristics, and the like, of liquid crystal panels is provided. A first control capacitor electrode (20) is included, provided below first and second sub-pixel electrodes (10, 12) and a protective insulating film (60). Also, control capacitors C1 and C2 are formed by the first and second sub-pixel electrodes (10, 12), and the first control capacitor electrode (20), through the protective insulating film (60). The visual angle characteristics of the liquid crystal panels are improved by the provision of the control capacitors C1 and C2. An increase in processes can be prevented, because the first control capacitor electrode (20) can be formed by a material identical to that of the source electrode. Moreover, the surface area of the control capacitor electrode can be miniaturized, and the aperture rate, and the like, can be improved, as a result of being able to make the protective insulating film (60) even thinner than the gate insulating film (49).

13 Claims, 25 Drawing Sheets

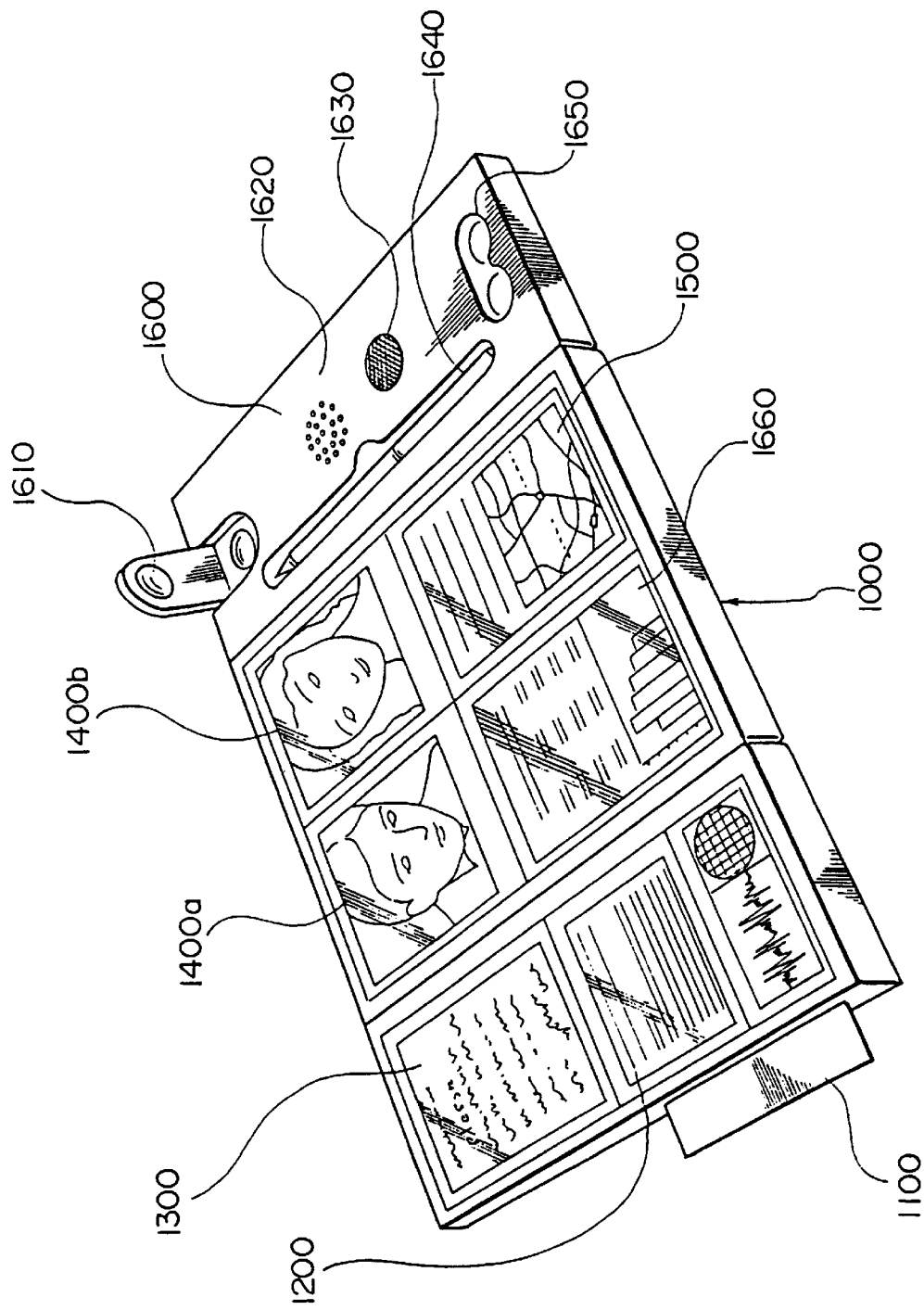

LIQUID CRYSTAL DISPLAY WITH SUB-PIXEL ELECTRODES, AND CONTROL CAPACITOR ELECTRODES FORMING CONTROL CAPACITORS

BACKGROUND OF THE INVENTION

1. Field of the Invention

The present invention relates to a liquid crystal display element in which pixel electrodes are divided into a multiple number of sub-pixel electrodes, a manufacturing method(s) thereof, and electronic devices (employing this element).

2. Technical Background

As described in *Flat Panel Display* 1994, in the article "The use of mass-produced panels using wide angle technology TFT for wide visual fields, as is required to make the leap to large size devices, is beginning to be seen in large size devices," (Dec. 10, 1993, Nikkei BP Company Publishing, page 166) various kinds of methods have been tested regarding wide angle visual field technology for liquid crystal panels. As representative of these methods, methods such as (1) a method for controlling liquid crystal orientation by techniques such as a rubbing process, and (2) a method for controlling voltage applied to liquid crystal molecules, utilizing a control capacitor, have been known.

The above method (1) equalizes the orientation of liquid crystal molecules in all directions. However, in this method, there are various problems, such as that the process becomes complicated, and that reproducibility is not good.

As for the above method (2), background art disclosed in, for example, JP Patent Laid-Open Application 4-348323, JP Patent Laid-Open Application 5-107556, and JP Patent Laid-Open Application 3-122621, is known. However, in this background technology, in order to form the control capacitor (control capacity) and an additional capacitor, it is necessary to add processes such as a special electrode forming process, a dielectric film (insulating layer) forming process, and the like, which create problems, such as process lengthening.

Similarly, as in the above method (2), background art, such as in JP Patent Laid-Open Application 6-102537, JP Patent Laid-Open Application 5-107556, JP Patent Laid-Open Application 6-95144, and JP Patent Laid-Open Application 5-289108, is known. In this background art, the control capacitor is formed using dielectric film, and so on, on top of a light blocking layer, and gate insulating film; and, pixel defects, line defects, and the like are caused if pinholes occur in the gate insulating film and dielectric film. Because of this, the film needs to be thickened, resulting in the capacitance per unit area of the control capacitor becoming small. If the capacitance per unit area is small, it is necessary to create the area on which the control capacitor is formed as large, in order to obtain the necessary capacitance. This worsens the aperture rate (light transmission characteristic) of the liquid crystal panel. In addition, if the control capacitor formation area is large, imperfections or the like also occur easily.

Moreover, in the liquid crystal panel, a holding capacitor (holding capacitance) for holding the electric load accumulated in the pixel electrode, is necessary. In the above method (2), the integration of this holding capacitor formation technology is a large technological problem.

The present invention is created to solve the above described technological problems. It is an object of the present invention to provide a liquid crystal display element, a manufacturing method thereof, and electronic devices, which can improve through a simple process the visual angle characteristics, and so on, of liquid crystal panels.

SUMMARY OF THE INVENTION

To solve the above problems, in the present invention, a liquid crystal display device including at least a thin film transistor, and a pixel electrode which is connected to the thin film transistor and drives a liquid crystal layer sealed between opposing electrodes, further includes: first to N-th (N being an integer equal to or more than 2) sub-pixel electrodes which were divided from said pixel electrode; first to L-th (L being an integer) control capacitor electrodes provided under a protective insulating film for protecting source electrodes of said thin film transistor; (I−1)st (I being an integer equal to or more than 2) control capacitors formed with (M−1)st (M being an integer, 1<M≦N) sub-pixel electrodes and Kth (K is an integer, 1≦K≦L) control capacitor electrodes, through said protective insulating film; and I-th control capacitors formed by the M-th sub-pixel electrodes and the K-th control capacitor electrodes through said protective insulating film. In other words each of the plurality of control capacitors is formed from one of the sub-pixel electrodes, one of the control capacitor electrodes, and the protective insulating film, wherein adjacent ones of the control capacitors share one of the sub-pixel electrodes or one of the control capacitor electrodes.

Moreover, in the present invention, the manufacturing method of the liquid crystal display device includes at least a thin film transistor, and, connected to said thin film transistor, a pixel electrode driving the liquid crystal layer sealed between it and an opposing electrode, and further includes: (A) a process for forming a first through the L-th (L being an integer) control capacitor electrode; (B) a process for forming a protective insulating film, for protecting a source electrode of said thin film transistor, on the top of the first to L-th control capacitor electrodes; and, (C) a process for forming the first to N-th (N being an integer equal to or more than 2) sub-pixel electrodes, dividing up said pixel electrode;

wherein, by means of said processes (A)–(C), through said protective insulating film, in conjunction with forming the (I−1)st (I being an integer equal to or greater than 2) control capacitor, formed by the (M−1)st (M being an integer, 1<M≦N) sub-pixel electrode, and by the K-th (K being an integer, 1≦K≦L) control capacitor electrode, through said protective insulating film, the I-th control capacitor is formed by the M-th sub-pixel electrode, and by the K-th control capacitor electrode.

According to the present invention, the I-th and the (I−1)st control capacitors are formed between the M-th and (M−1)st sub-pixel electrodes, and the K-th control capacitor electrode. As a result, the electrical voltage applied to the M-th sub-pixel electrode can be defined as different from the electrical voltage applied to the (M−1)st sub-pixel electrode, resulting in that the visual angle characteristics of the liquid crystal layers that are the regions of the M-th and (M−1)st sub-pixel electrodes can be made different from each other. This results in an ability to improve the visual angle characteristics of one entire pixel, from mutual interpolated matching of these different visual angle characteristics. Moreover, in the present invention, the protective insulating film, as a dielectric body, is formed with the (I−1)st and I-th control capacitors. Also, compared to the case in which the gate insulating film is the dielectric body, the film thickness of this protective insulating film can be made thinner, in the case when the protective insulating film is the dielectric body. This results in an ability to enlarge the capacitance per unit area, and allows miniaturization of the area of the control capacitor electrode. The result is a design capability of an improved aperture rate, and the like.

In this case, it is desirable that the first to L-th control capacitor electrodes are formed of the same material as said source electrode. Moreover, it is desirable that the first to L-th control capacitor electrodes are formed by a process identical to that for said source electrode. As a result, it is not necessary to add new processes in order to form the control capacitor electrode, and design improvements become possible in reliability and in reduction of manufacturing cost.

Moreover, it is desirable that the film thickness of the protective insulating film be thinner than that of the gate insulating film provided above the gate electrode of the thin film transistor; and, in said process (B), it is desirable to form the film thickness of the protective insulating film as even thinner than the gate insulating film formed on top of the gate electrode of the thin film transistor. As a result, it is possible to miniaturize the area of the control capacitor electrode, and to design an improvement in the aperture rate, and the like.

Moreover, in the present invention, it is also acceptable for the first to L-th control capacitor electrodes to become a part of a black matrix, which becomes a light blockage layer. In the event that the control capacitor electrode is formed from material that has a light blocking characteristic, by means of utilizing this as a black matrix, it is possible to design an improvement in contrast, and the like.

Moreover, in the present invention, it is also acceptable to have the K-th control capacitor electrode formed such that a part of the region of a gap between said (M−1)st sub-pixel electrode and said M-th sub-pixel electrode is covered, and formed such that the K-th control capacitor electrode is distant from electrodes which are formed on the same layer as said K-th control capacitor electrode. If this is done, in conjunction with being able to design a further improvement in the aperture rate, and the like, occurrences/can be prevented of manufacturing defects and the like, caused by, for example, bonded rubber (rubber attachments).

Moreover, it is acceptable to have at least one of said first to N-th sub-pixel electrodes include a first to J-th (J being an integer) holding capacitor, formed through a given holding capacitor electrode. The formation of the holding capacitor in this way solves the problem of decreased voltage, caused by leaking of electrical current, and the like, when the thin film transistor is off.

In this event, it is acceptable to include only the first holding capacitor formed by said first sub-pixel electrode connected to the source electrode of the thin film transistor, and formed by the given holding capacitor electrode. There is a particularly large effect in the improvement in the display characteristics from the holding capacitor being formed on the first sub-pixel electrode, connected directly to the thin film transistor.

Furthermore, in this event, the holding capacitor may be formed with two or more sub-pixel electrodes. If this is done, the holding capacitor can be formed corresponding to each of the two or more sub-pixel electrodes, allowing improvement as to the characteristic of holding applied voltage, of these sub-pixel electrodes, in which the holding capacitor has been formed.

Moreover, in this event, in order to improve the display characteristics and the like, it is desirable if the holding capacitor electrode is a scan line connected to an adjacent thin film transistor.

Furthermore, in the present invention, at least one of said (I−1)th control capacitors, through the gate insulating film provided on top of the gate electrode of the thin film transistor, is formed by the (M−1)st sub-pixel electrode, and the control capacitor electrode provided below the gate insulating film, and at least one of said I-th control capacitors, through the gate insulating film. In other words each of the plurality of control capacitors is formed from one of the sub-pixel electrodes, one of the control capacitor electrodes, and the protective insulating film, wherein adjacent ones of the control capacitors share one of the sub-pixel electrodes or one of the control capacitor electrodes, may be formed by the M-th sub-pixel electrode, and by the control capacitor electrode provided below the gate insulating film. As a result, the control capacitor electrode provided below the protective insulating film can be formed in a different layer than that of the control capacitor electrode provided below the gate insulating film. As a result, the occurrence of manufacturing defects, caused by bonded rubber, and the like, can be decreased.

Moreover, in electronic devices related to the present invention, a liquid crystal device is included having any of the liquid crystal display elements described above. This allows the capability to design an improved aperture rate, an improved sight sensing characteristic, a lowering of costs and the like, in liquid crystal devices utilizing electronic mechanisms in remote controllers, calculators, portable phones, portable-type data devices, projectors, personal computers, and the like.

BRIEF DESCRIPTION OF THE DRAWINGS

FIG. 25 is an example of a portable data device for personal use, as one of the electronic devices.

DESCRIPTION OF PREFERRED EMBODIMENTS

The embodiments of the present invention are explained below in detail, with reference to the figures.

1. The First Embodiment

Figure 1:
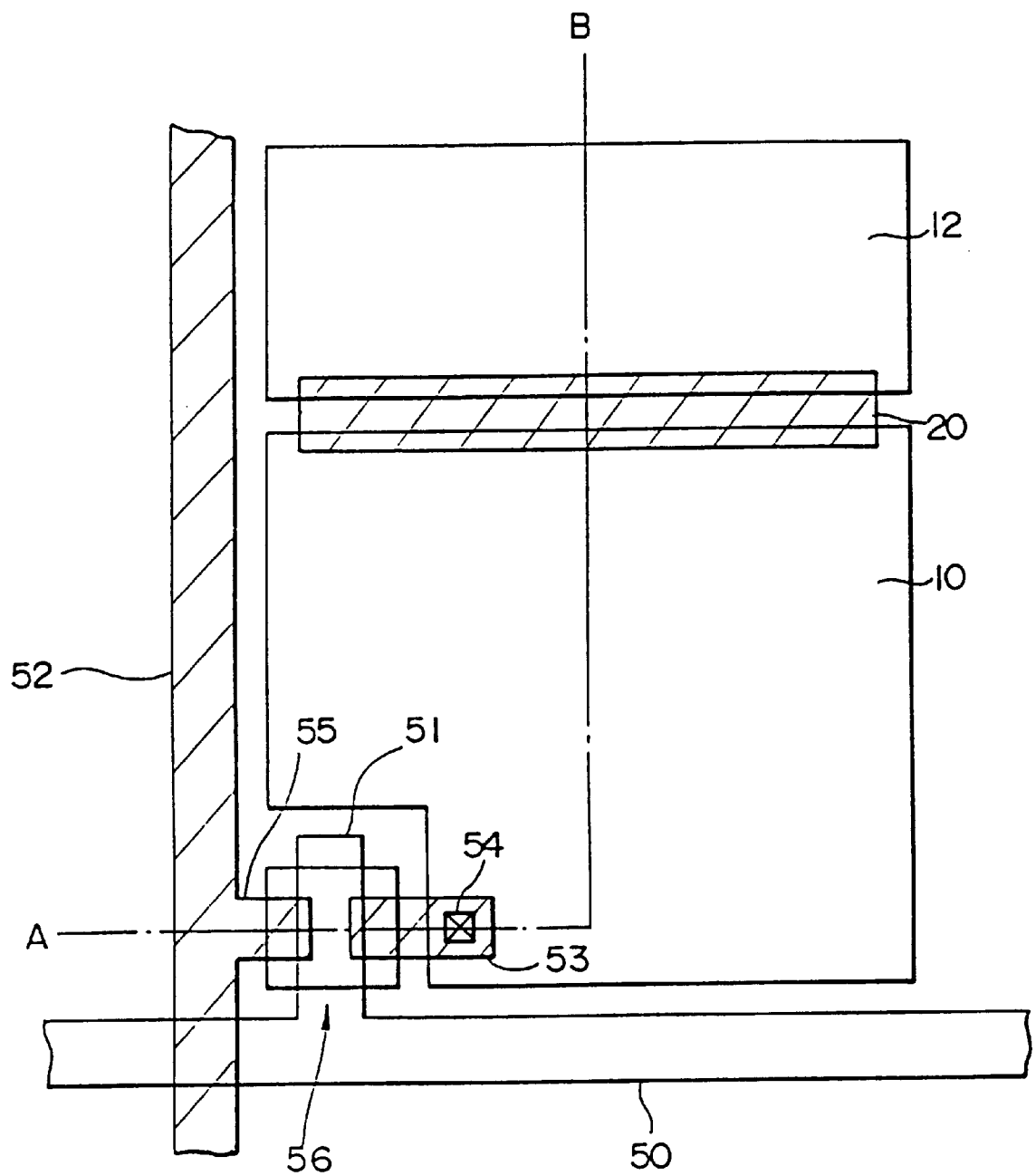
FIG. 1 shows a top view of the structure of the first embodiment.
Figure 2:
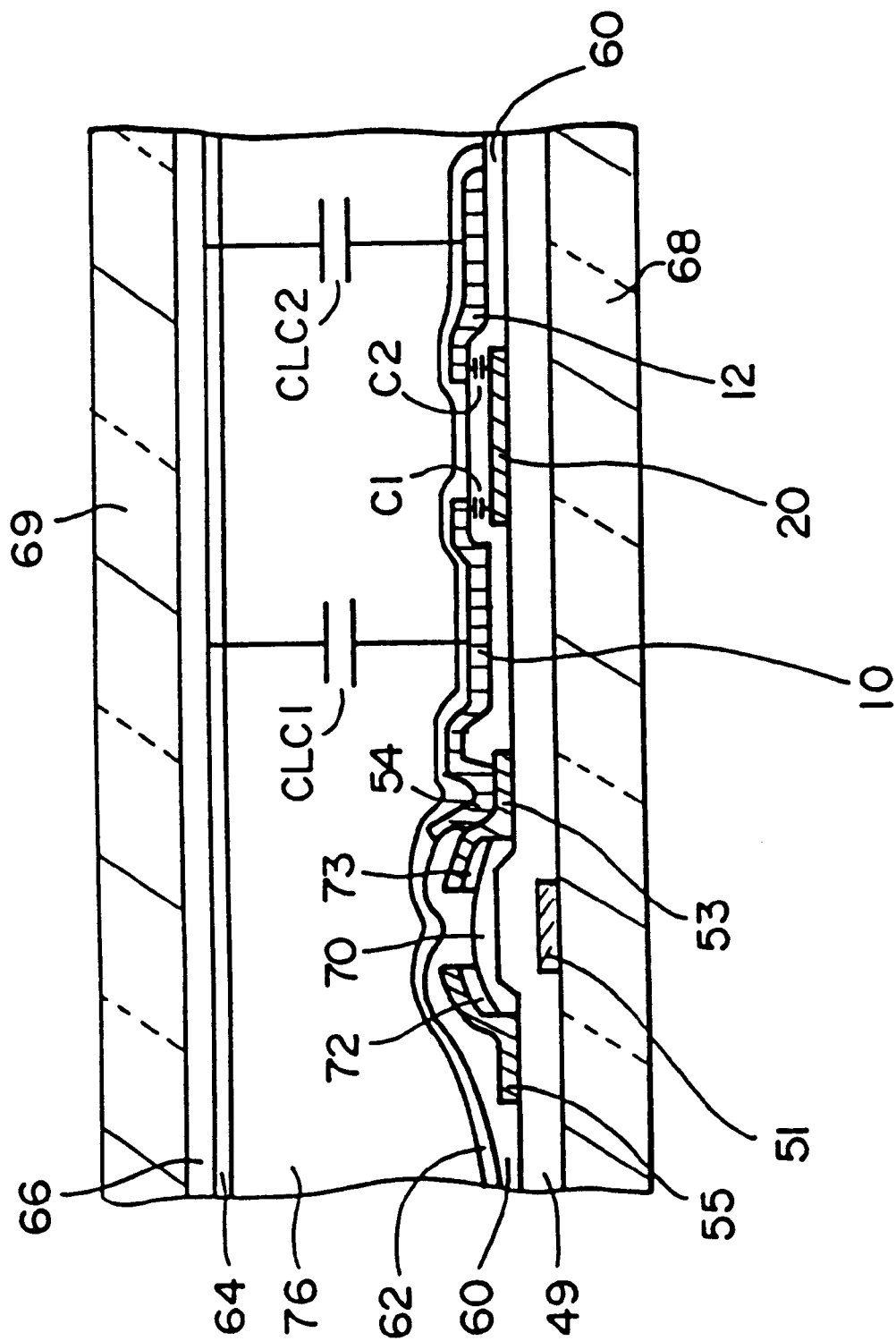
FIG. 2 shows a cross section of A–B in FIG. 1.

FIG. 1 shows a top view of the structure of the liquid crystal display element, related to the first embodiment, and FIG. 2 shows a cross section of A–B in FIG. 1.

As shown in FIG. 1 and FIG. 2, this liquid crystal display element includes a thin film transistor (called TFT hereafter) 56, and a pixel electrode divided into first and second sub-pixel electrodes 10 and 12; it drives, by means of the pixel electrode, a liquid crystal layer 76 which is sealed by an opposing electrode 66. The TFT 56 includes a gate electrode 51, a source electrode 53, a drain electrode 55, an intrinsic silicon film 70, and n-type silicon films (ohmic layers) 72 and 73. The first sub-pixel electrode 10 is connected to the source electrode 53 through a contact 54, and the gate electrode 51 and the drain electrode 55 are connected to a scan line 50 and a signal line 52, respectively. The liquid crystal panel (liquid crystal device) is composed by positioning a plurality of the scan lines 50 and the signal lines 52 such that they cross in the shape of a matrix, and by positioning the TFT at the cross points.

As shown in FIG. 2, under a protective insulating film 60 which is a protective film for the source electrode 53 and the like, a first control capacitor electrode 20 is provided. In this embodiment, this first control capacitor electrode 20 is formed with the same material as that of the source electrode 53. Thus, it is not necessary to add an additional process for forming the first control capacitor electrode 20, and, as a result of this, it is possible to design so as to prevent complexity in the manufacturing processes and decrease manufacturing costs. However, it is also possible to form the first control capacitor electrode 20 with a material that is different from that of the source electrode 53.

The control capacitor (control capacity) C1 is formed with a protective insulating film 60, which has been made dielectric, the first sub-pixel electrode 10 as an upper electrode, and the first control capacitor electrode 20 as a lower electrode. Similarly, a control capacitor C2 is formed with protective insulating film 60, the second sub-pixel electrode 12, and the first control capacitor 20. Meanwhile, a liquid crystal capacitor CLC1 is formed with the liquid crystal layer 76 as a dielectric body, by the first sub-pixel electrode 10 and the opposing electrode 66; a liquid crystal capacitor CLC2 is formed by the second sub-pixel electrode 12 and the opposing electrode 66.

Figure 3:
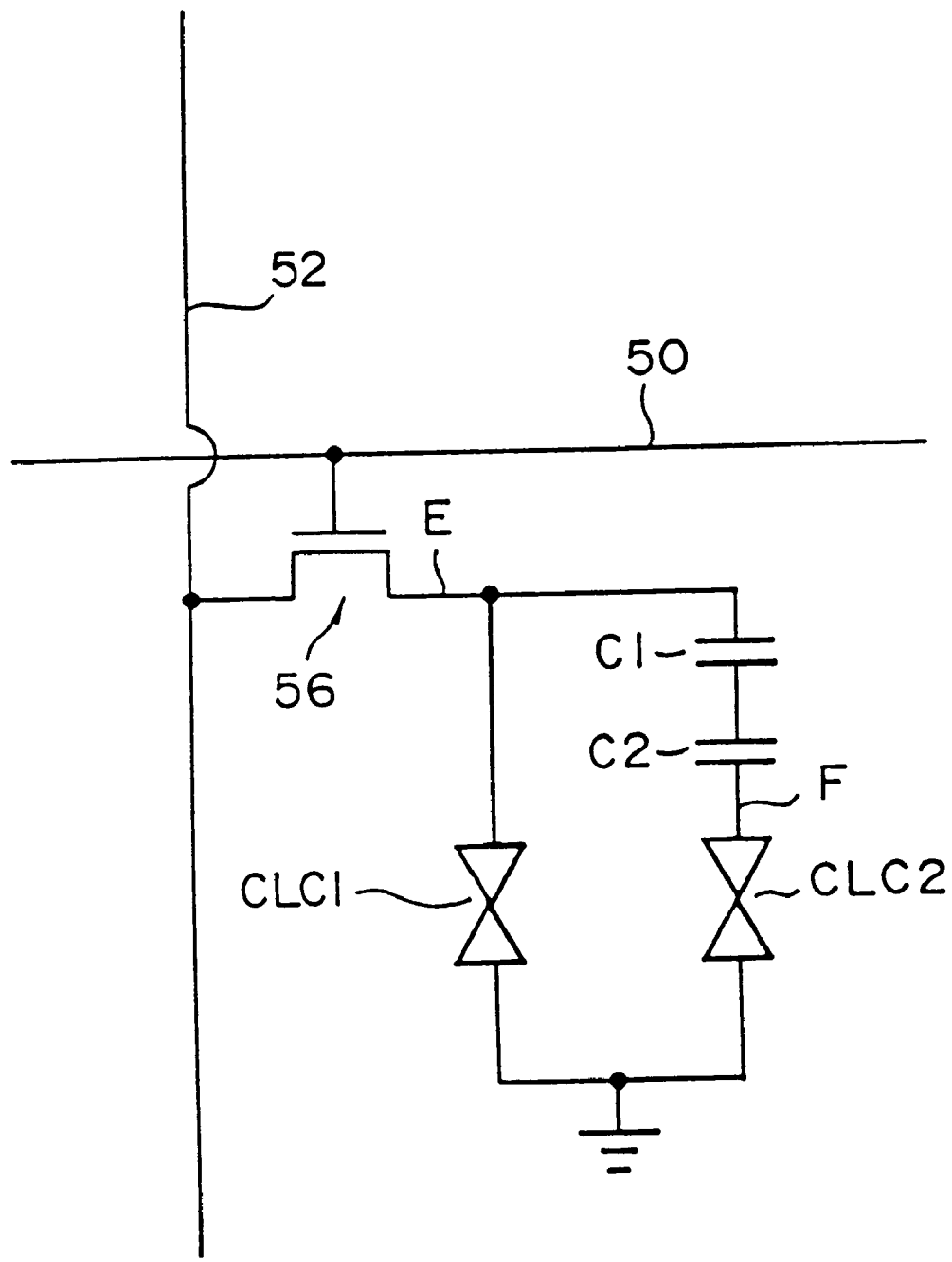
FIG. 3 is an equivalent circuit diagram of the first embodiment.

An equivalent circuit diagram of this embodiment is shown in FIG. 3. The liquid crystal capacitor CLC1 is connected to a terminal E which is a source electrode of the TFT 56. In addition, the control capacitors C1 and C2 and liquid crystal capacitor CLC2 are serially connected to the terminal E. If a voltage of the terminal E when the scan line 50 is selected and when the TFT 56 turns on, is given as VE, the voltage VE applies to the liquid crystal capacitor CLC1 as is (without any change). On the other hand, because a voltage of a terminal F is divided in its capacitance by the control capacitors C1 and C2 and the liquid crystal capacitor CLC2, a voltage of VF=VE×(C1+C2)/(C1+C2+CLC2) is applied to the liquid crystal capacitor CLC2. As described, by differentiating the voltage VE which is applied to the liquid crystal capacitor CLC1, and the voltage VF which is applied to the liquid crystal capacitor CLC2, it is possible to differentiate the light transmission rate of the liquid crystal layer in areas of the liquid crystal capacitors CLC1 and CLC2. As a result, the visual angle of these liquid crystal layers can be made different, and thus, the visual angle characteristics of the entire body of one pixel (or the entire body of the liquid crystal panel) can be improved by these different visual angle characteristics as interpolated with each other.

Figure 4:
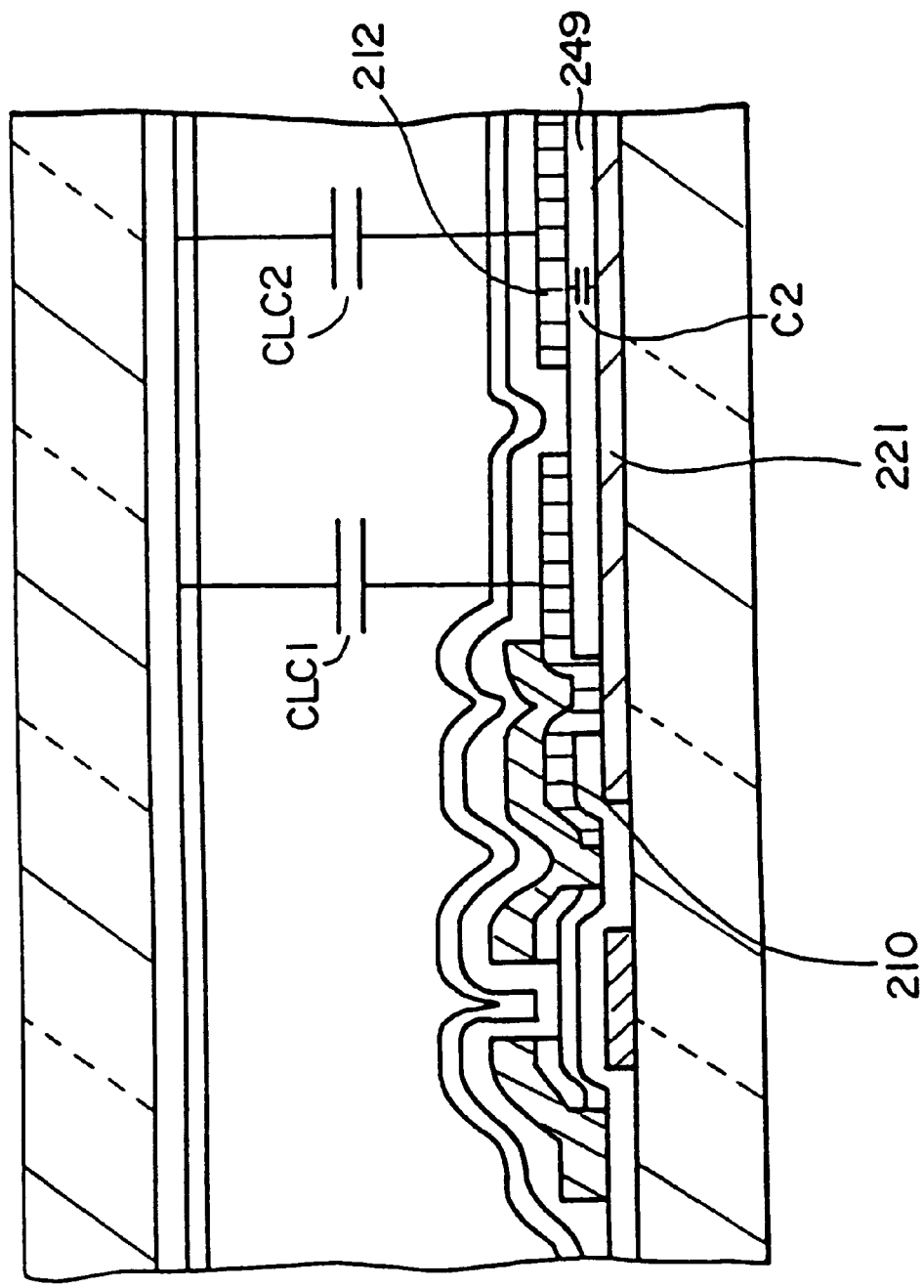
FIG. 4 is an example of a cross sectional diagram of a conventional example.

One of the features of this embodiment is the point concerning the formation of control capacitors C1 and C2 with the protective insulating film 60, having been made as a dielectric body. With regard to this, for example, in JP Patent Laid-Open Application 6-102537, etc., and as shown in FIG. 4, the control capacitor C2 is formed by having the gate insulating film 249 dielectric. Because pixel defects and the like occur when pinholes, etc. occur in the gate insulating film 249, it is normally necessary to thicken the gate insulating film 249. Because capacitance per unit is decreased if the film is thickened, it is required that the area of the control capacitor electrode 221 (the area in which it overlaid by the second sub-pixel electrode 212) be large; as a result, the aperture rate and the like worsen. On the other hand, the protective insulating film 60 is used in this embodiment has been made as a dielectric body, which has been created as thinner than the gate insulating film. Therefore, the capacitance per unit area can be increased, and the area of the control capacitor electrode 20 can be reduced. Because of this, the aperture rate (light transmission characteristics) can be improved.

The reason why the protective insulating film can be thinner than the gate insulating film, is as follows. That is, in order to prevent short circuits between the gate electrode and the silicon layer, no pinholes may exist in the gate insulating film. In order to prevent this, it is necessary to either thicken the gate insulating film, or make the gate insulating film a two-layer structure, either of which thickens the gate insulating film. On the other hand, the protective insulating film can normally be thinner than the gate insulating film since it is formed to prevent incoming moisture, and the like, from the liquid crystal layer.

Figure 5A:
FIG. 5A–FIG. 5E are cross sectional process diagrams for explaining the manufacturing process of the first embodiment.

Next, an example of a manufacturing process of the liquid crystal display element in this embodiment is described using process cross sectional diagrams shown in FIG. 5A through FIG. 5E. First, a gate electrode 51 composed of Cr (chromium) having a thickness of approximately 1300 angstrom or the like, for example, is formed on a glass substrate (non-alkaline substrate) 68 by means of spattering and photoetching (FIG. 5A).

Figure 5B:
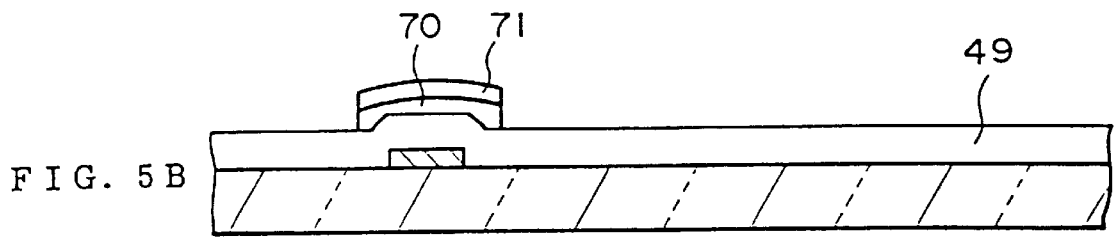

Next, by means of, for example, a plasma CVD method, a gate insulating film 49 composed of a silicon nitride film SiNx or the like, an intrinsic silicon film 70, and an n-type silicon film (ohmic layer) 71 are continuously generated and are made insular by photoetching (FIG. 5B). In this case, the thickness of the gate insulating film 49, the intrinsic silicon film 70, and the n-type silicon film 71, respectively, is approximately 3000 angstroms, 3000 angstroms, and 500 angstroms. In addition, the gate insulating film 49 can be created to have a structure in which a silicon oxide film SiOx having a thickness of approximately 1000 angstrom, for example, is provided under the silicon nitride film SiNx.

Figure 5C:
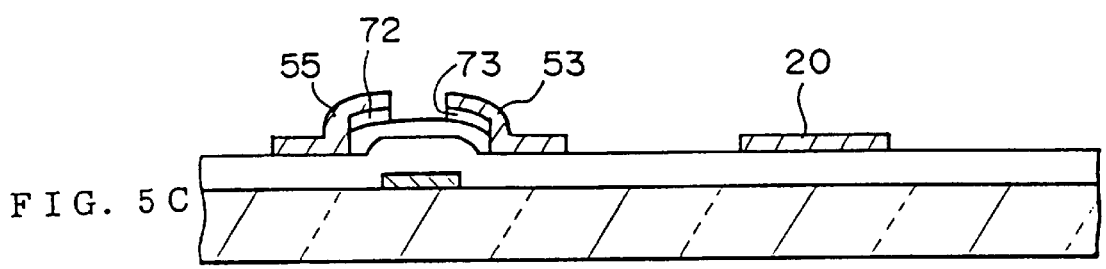

Next, a source electrode 53, a drain electrode 55, and the first control capacitor electrode 20, each having thickness of approximately 1300 angstroms, and each composed of Cr or the like, for example, are formed by means of spattering and photoetching; in addition, a source-drain separation is made by separating (the n-type silicon film 71 into) n-type silicon films 72 and 73 (FIG. 5C). In this embodiment, the source electrode 53 and the like, and the first control capacitor electrode 20 are formed with the same material. Therefore, an addition of another manufacturing process for creating the control capacitor is not required, which reduces cost. In addition, a method which provides an etch stopper (ES) in the source-drain separation area, can be introduced.

Figure 5D:
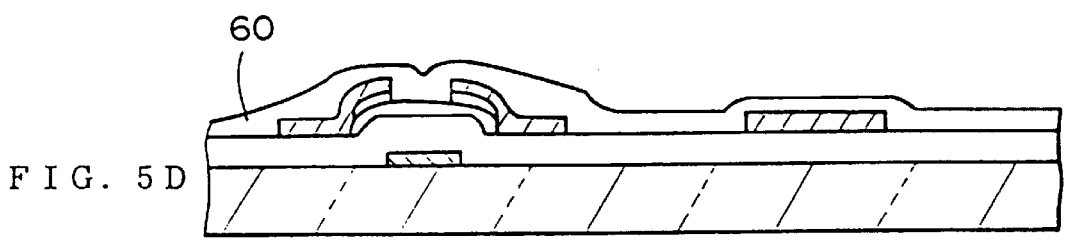
Figure 5E:
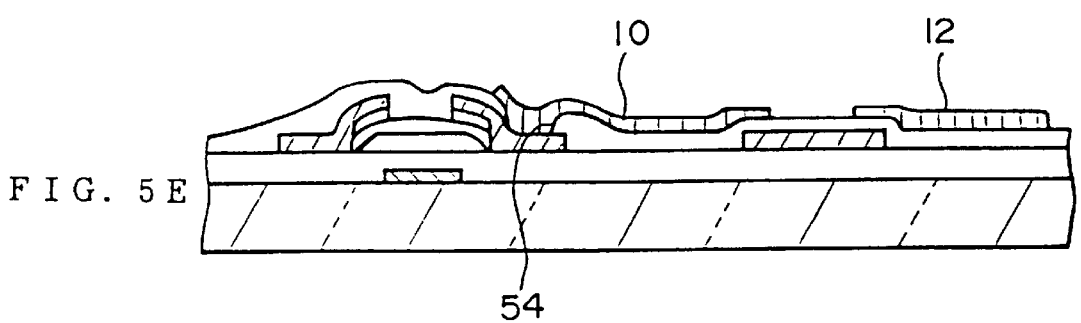

Then, a protective insulating film 60 is formed, which becomes a protective film for the source electrode 53, and the like (FIG. 5D). This protective insulating film 60 is formed with a silicon nitride film SiNx having approximately 2000 angstroms. Since the thickness of the protective insulating film 60 can be thinner than that of the gate insulating film 49, the capacity of the control capacitors C1 and C2 (see FIG. 2) per unit area can be increased, and as a result, the aperture rate and the like are formed on the source electrode 53 and on the protective insulating film 60 can be improved. Next, a contact 54 is opened, and a first and second sub-pixel electrode 10 and 12, each having thickness of approximately 500 angstroms, are each composed of ITO (indium oxide film) or the like, by means of spattering and photoetching (FIG. 5E). As shown in FIG. 2, an orientation film 62 is formed after this. Then, with the TFT side substrate formed as described, and an opposing (facing) substrate composed of the grass substrate 69, the opposing electrode 66, the orientation film 64, and the like, the liquid crystal layer 76 is sealed (enclosed), to complete the liquid crystal panel.

Figure 6A:
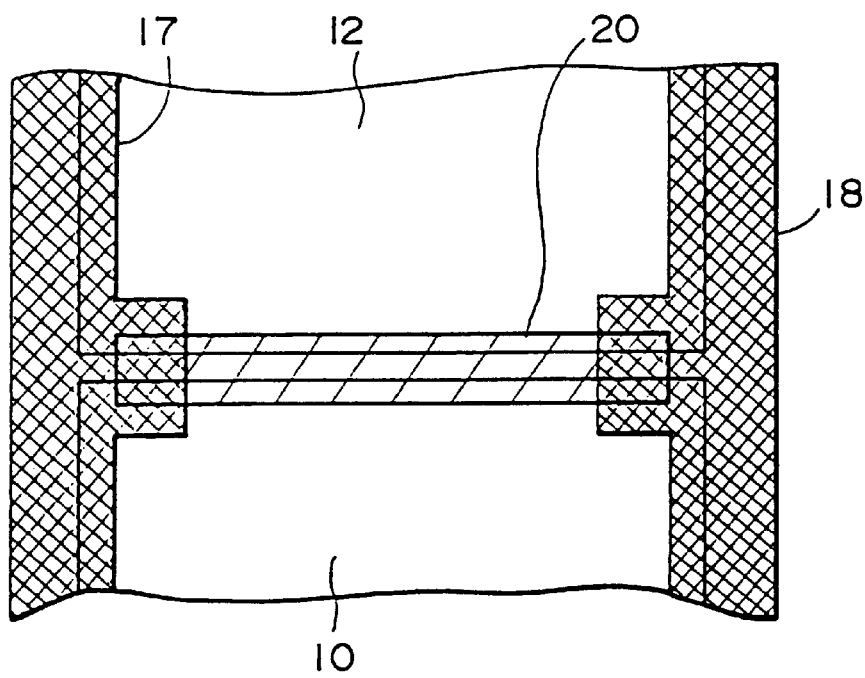
FIG. 6A–FIG. 6B describes an example of a case when a black matrix is formed.
Figure 6B:
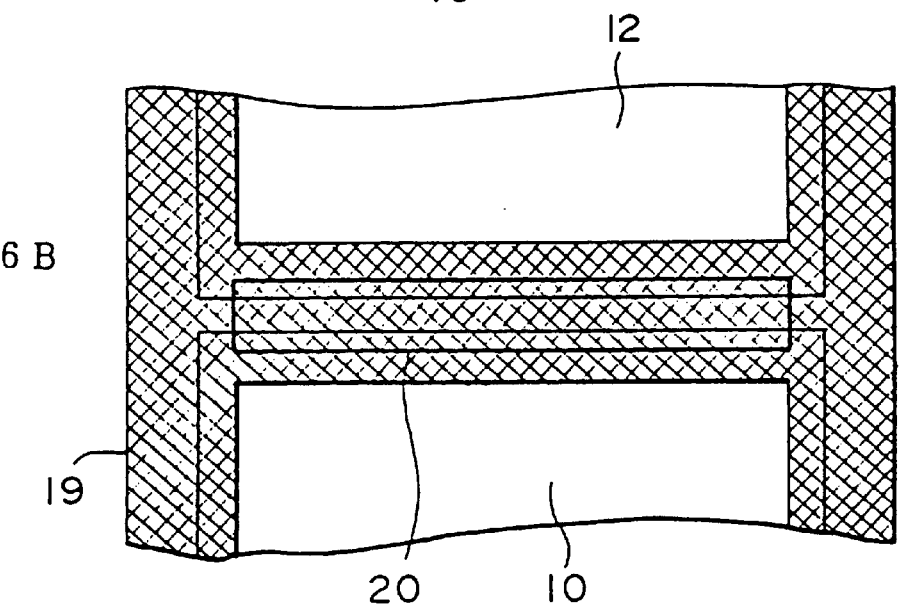

According to this embodiment, the control capacitor 20 can be made a part of a black matrix which becomes a light blocking layer. In FIG. 6A, leakage of light is prevented by means of black matrices 17 and 18 provided on the opposing substrates, and the control capacitor 20 is composed of Cr, to improve contrast. According to this embodiment, since the capacity of the control capacitor per unit area can be increased as described above, an overlap between the first and second sub-pixel electrodes 10 and 12, and the control capacitor electrode 20, can be made small. Therefore, even in this case, the aperture rate and the like can be improved according to this embodiment. In addition, as shown in FIG. 6B, a black matrix 19 can be provided such that the control capacitor electrode 20 is completely covered, or the black matrix (matrices) can be composed as provided on the TFT side substrate.

Figure 7:
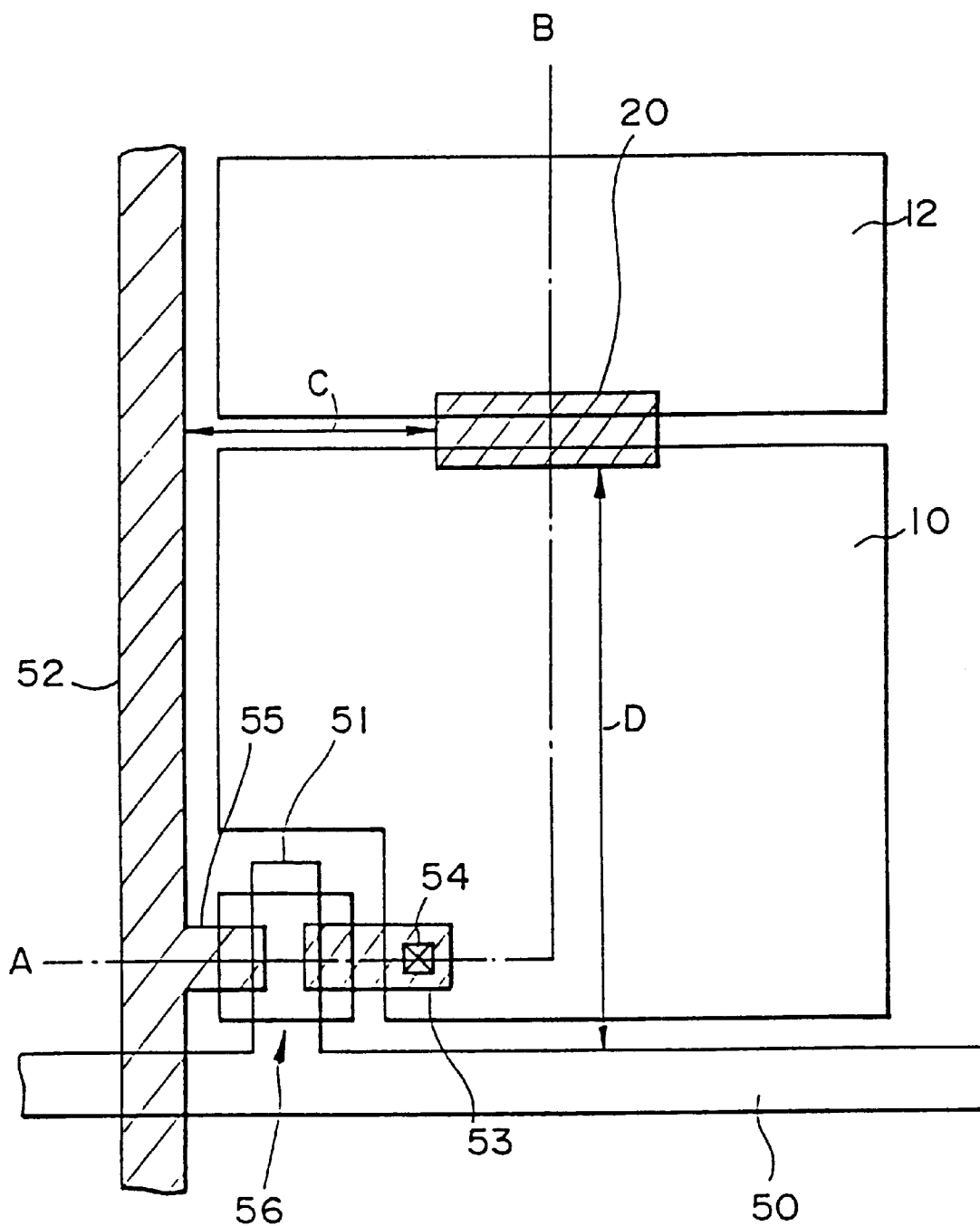
FIG. 7 describes the positioning of a control capacitor electrode.

Moreover, according to this embodiment, the capacity of the control capacitor per unit area can be increased, and the area of the first control capacitor electrode 20 can be reduced. Because of this, as shown in FIG. 7, it is possible to provide a first control capacitor 20 having a small area so that part of the region of the gap between the first and the second sub-pixel electrode 10 and 12 is covered. With such a composition, the length indicated as C in FIG. 7 can be the distance separating the first control capacitor electrode 20 and the signal line 52. Therefore, if the length C can be sufficiently large, occurrences of imperfection in manufacturing, caused from adhesive dust and the like, can be reduced. That is, according to this embodiment, because the area of the first control capacitor electrode 20 can be reduced, the length C can be lengthened, and imperfections in manufacturing caused by adhesive dust and the like can be reduced. In addition, as shown in FIG. 4, when the first control capacitor electrode is formed with the same material and on the same layer as the scan line, the above described imperfection in manufacturing can be reduced by sufficiently lengthening the length D in FIG. 7.

2. The Second Embodiment

Figure 8:
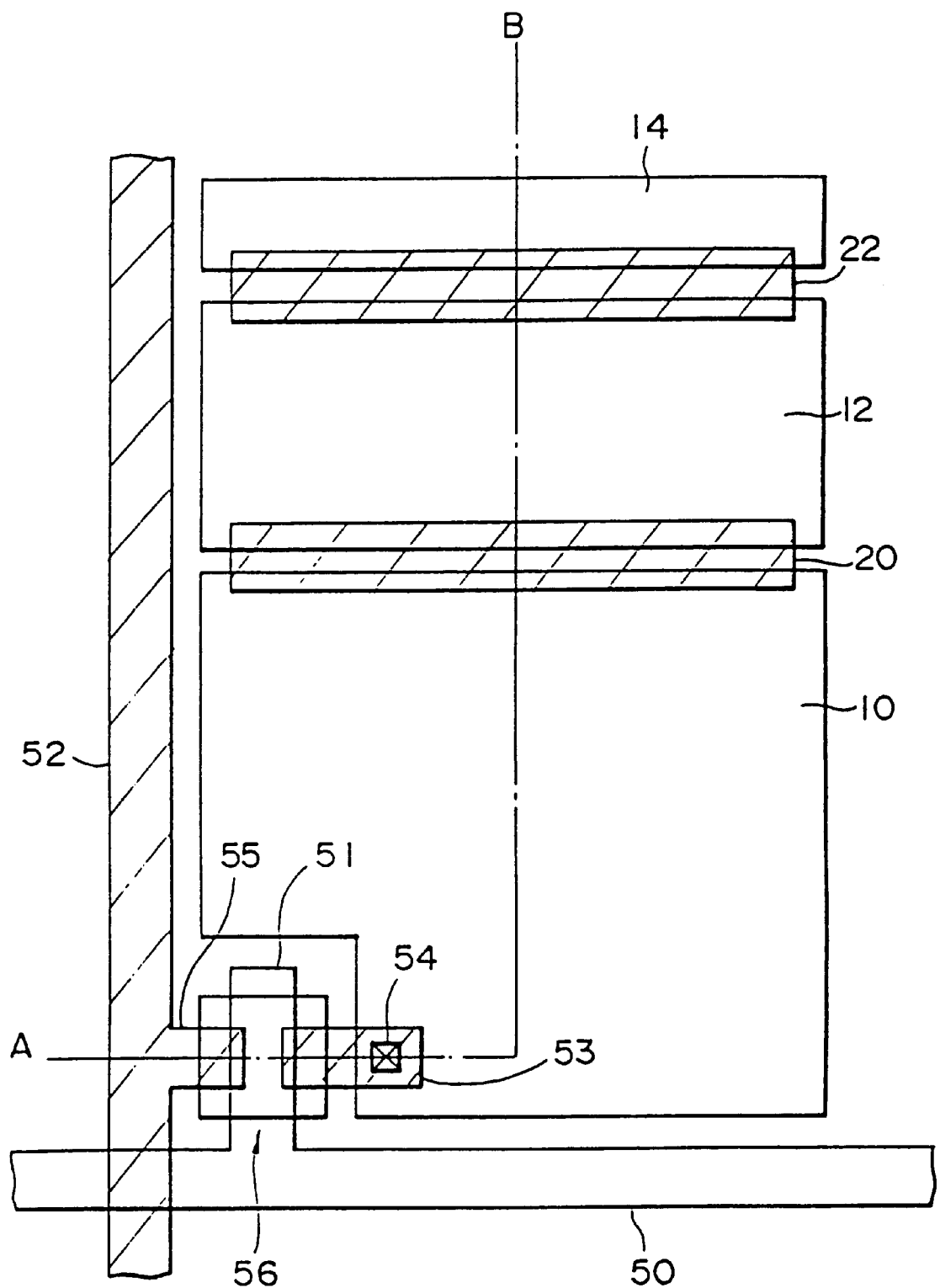
FIG. 8 shows a top view of the structure of the second embodiment.
Figure 9:
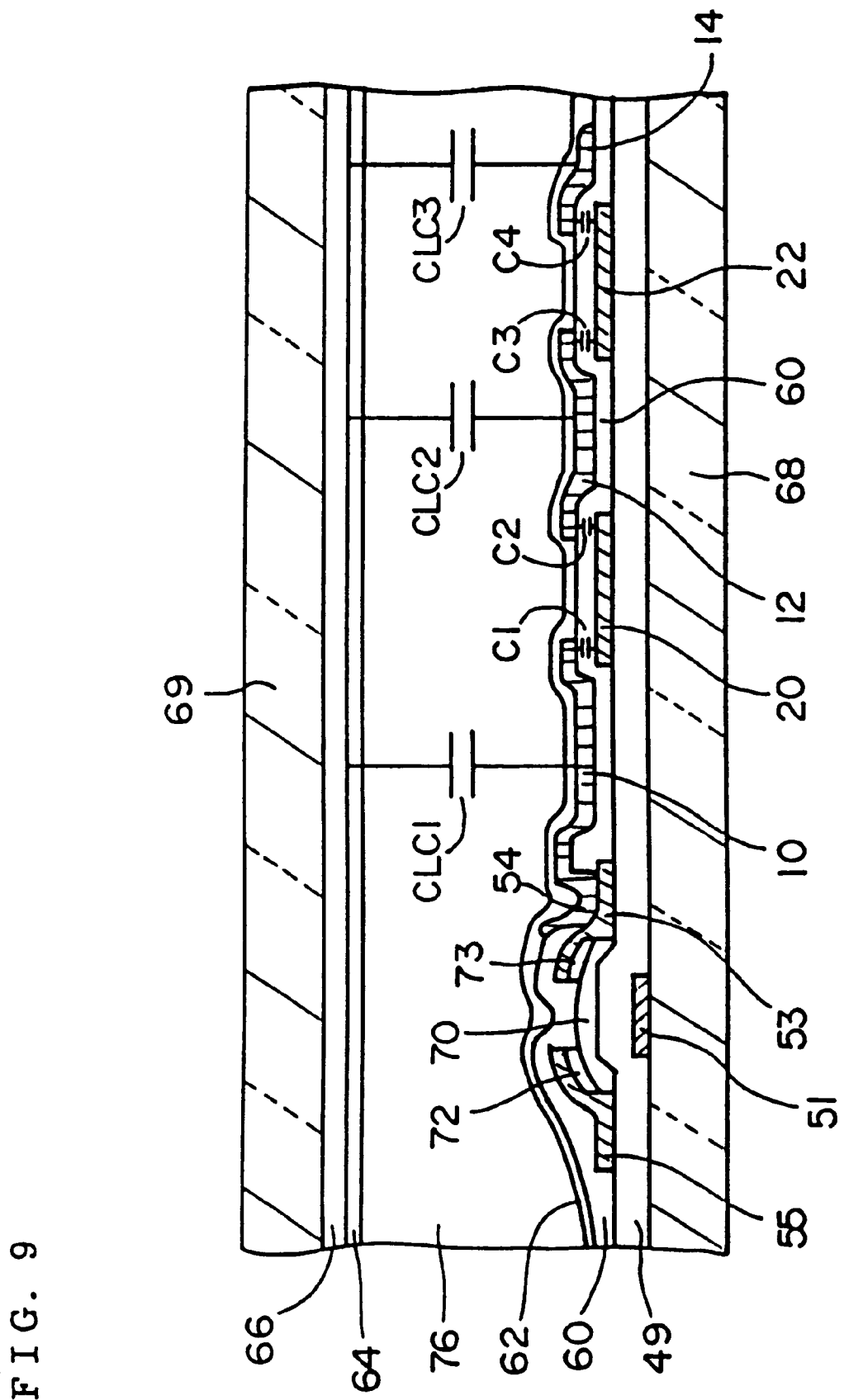
FIG. 9 shows a cross section of A–B in FIG. 8.

FIG. 8 shows a top view of the structure of a liquid crystal display element related to the second embodiment, and FIG. 9 is a cross section of A–B in FIG. 8.

Figure 10:
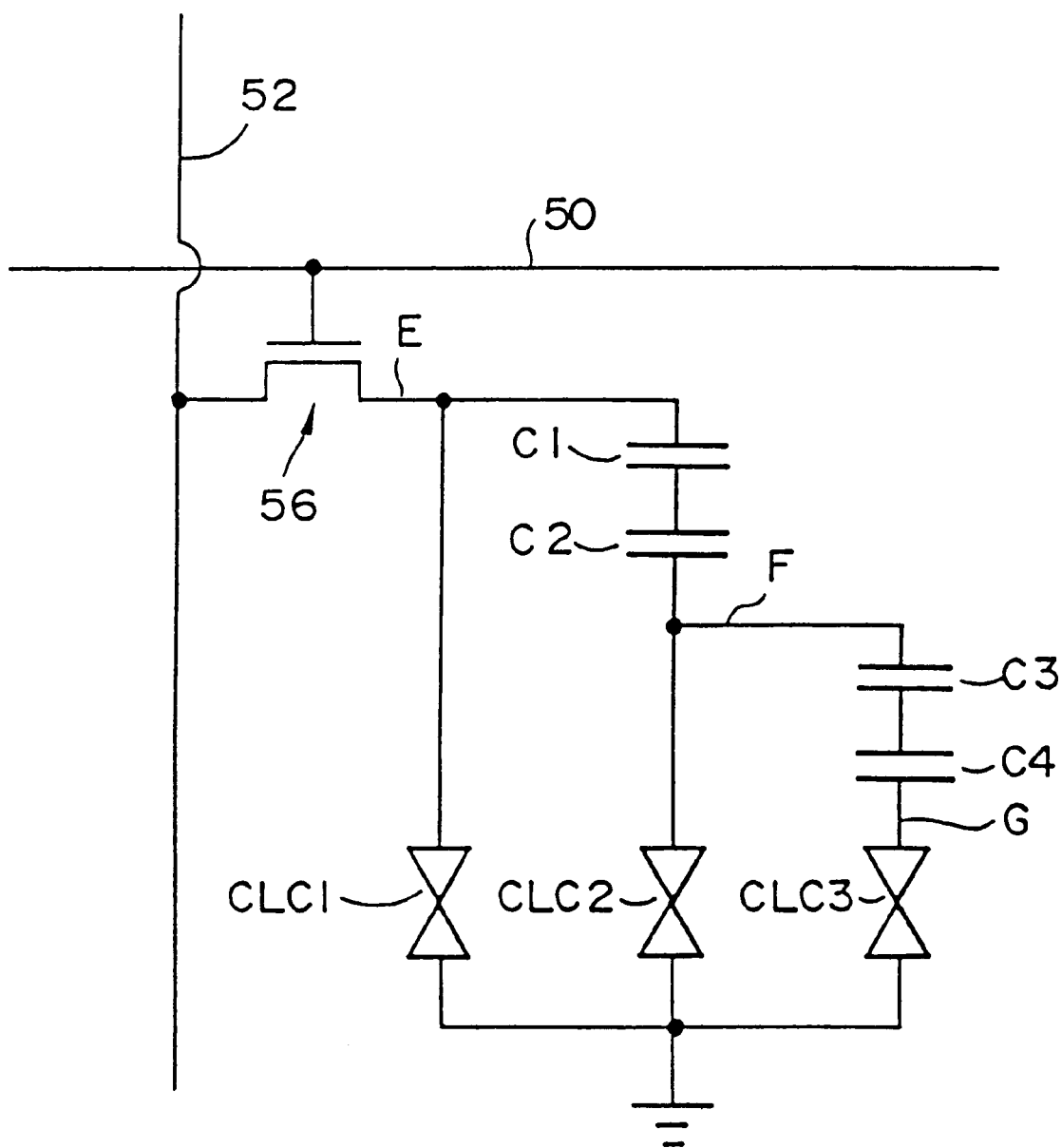
FIG. 10 is an equivalent circuit diagram of the second embodiment.

A difference from the first embodiment is the point in which a second control capacitor electrode 22 and a third sub-pixel electrode 14 are provided, and where control capacitors C3 and C4 are formed. As a result, an equivalent circuit diagram of the second embodiment becomes as shown in FIG. 10. Given a voltage of a terminal E as VE, this value VE, the voltage VF of the terminal F, and the voltage VD of the terminal G can be differentiated. Because of this, the light transmission rate of the liquid crystal layer in areas CLC1, CLC2, and CLC3, can be differentiated, and thus, the visual angle characteristics of these liquid crystal layers can be differentiated. Then, by these different visual angle characteristics being interpolated with each other, the visual angle characteristics of the entire body of one pixel (or the entire body of the liquid crystal panel) can be better improved, as compared to the first embodiment.

Here, an example of a case when a pixel electrode is divided into three is shown in FIG. 8; however, it can be divided into 4 or more. That is, according to this embodiment, the pixel electrode can be divided into the first to the N-th (N being an integer equal to or more than 2) sub-pixel electrodes, to provide the first to the L-th (L is an integer) control capacitor electrodes.

Especially, in this embodiment, because the area of the control capacitor electrode can be reduced, the aperture rate and the like do not worsen compared to conventional methods, even if the pixel electrode is divided into a multiple number (of sub-pixel electrodes) as described above. Therefore, according to this embodiment, an additional improvement in the visual angle characteristics is possible by dividing the pixel electrode into a multiple number (of sub-pixel electrodes), without worsening the aperture rate and the like.

In addition, the first and second control capacitor electrodes 20 and 22 can be a part of the black matrix shown in FIG. 6A and FIG. 6B, or the first and second control capacitor electrode 20 and 22 and the like can have a pattern shape shown in FIG. 7, in the second embodiment as well.

3. The Third Embodiment

Figure 11:
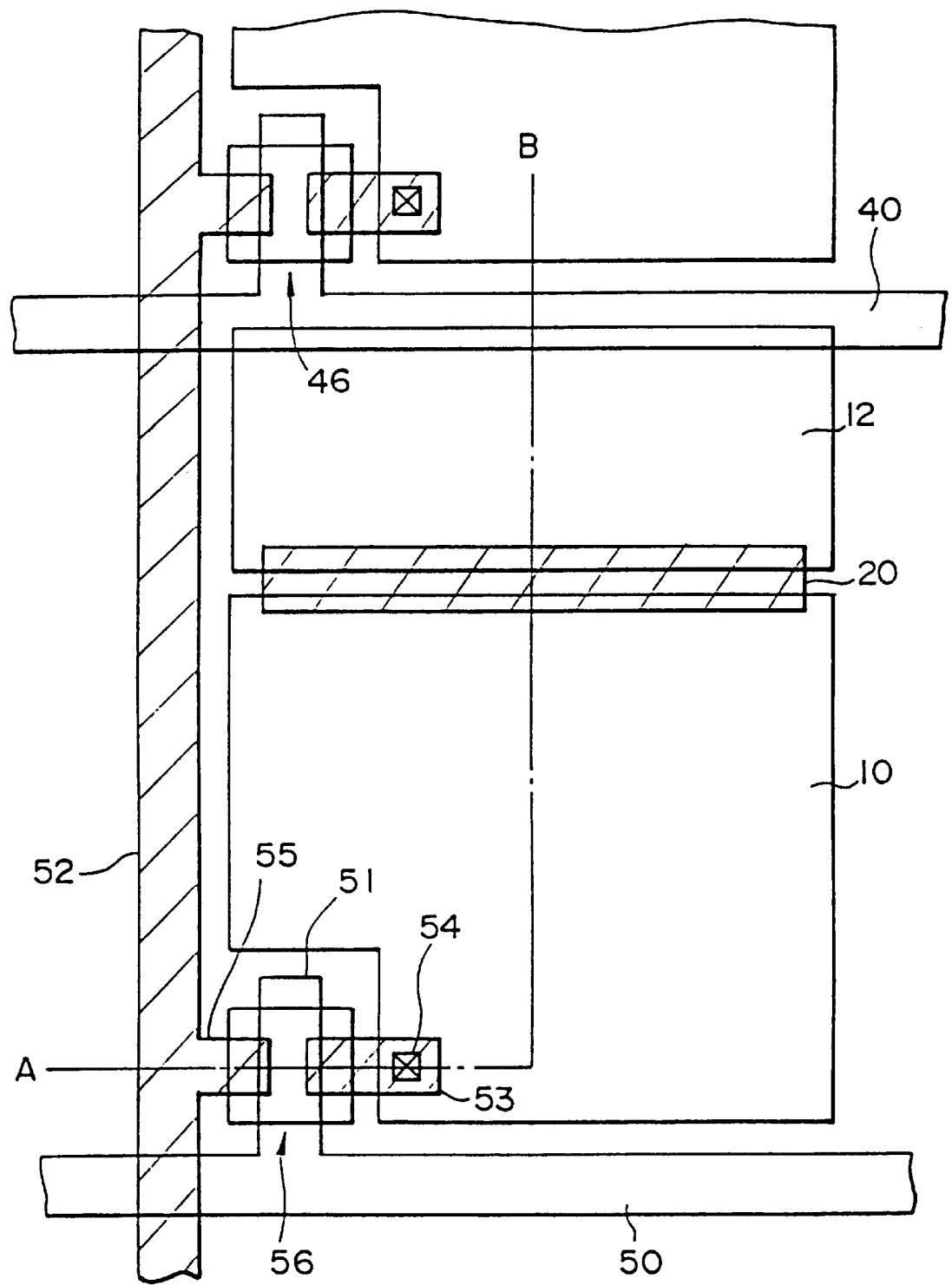
FIG. 11 shows a top view of the structure of the third embodiment.
Figure 12:
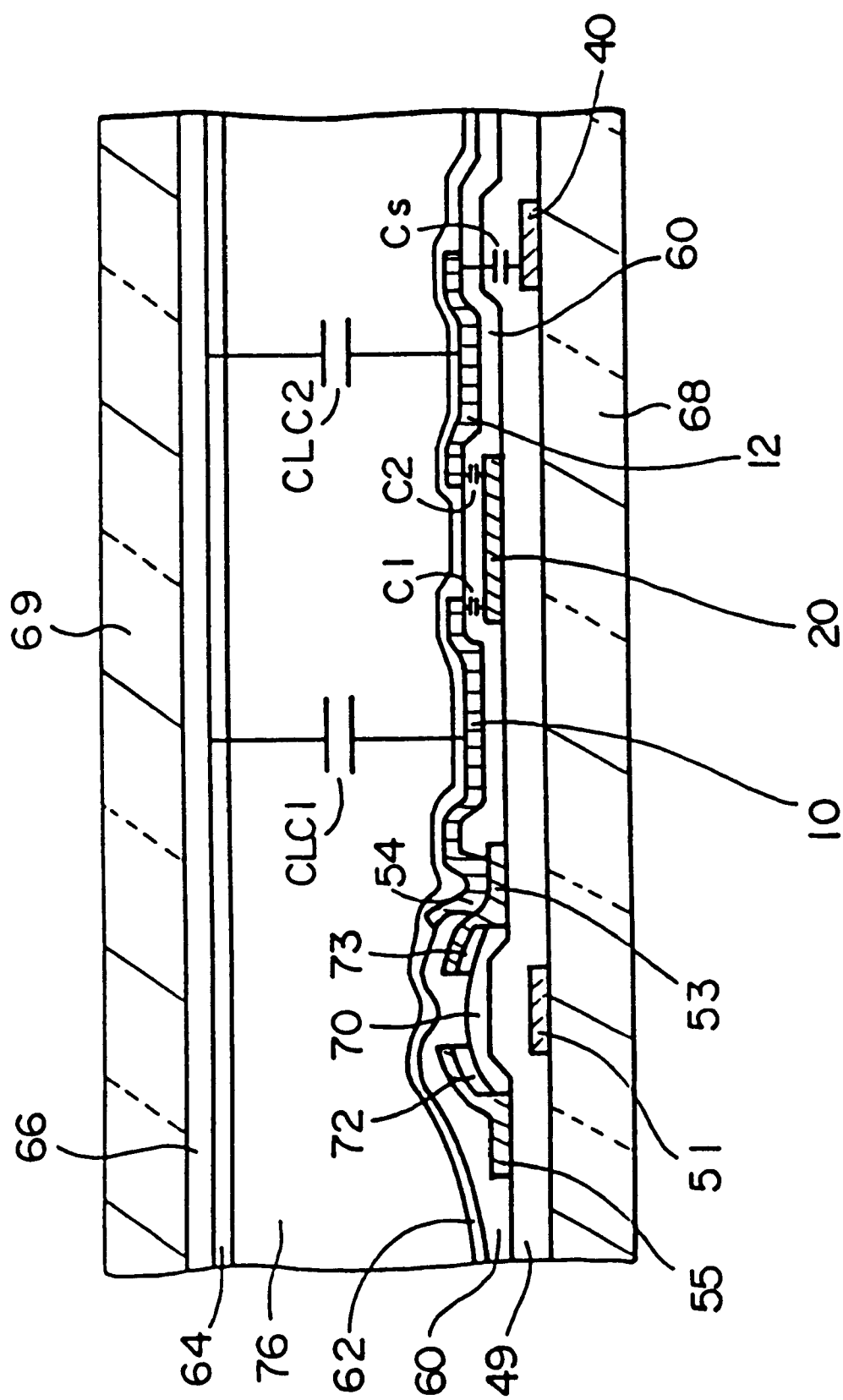
FIG. 12 shows a cross section of A–B in FIG. 11.

FIG. 11 is a top view of the structure of a liquid crystal display element related to the third embodiment, and FIG. 12 shows a cross section of A–B in FIG. 11.

Figure 13:
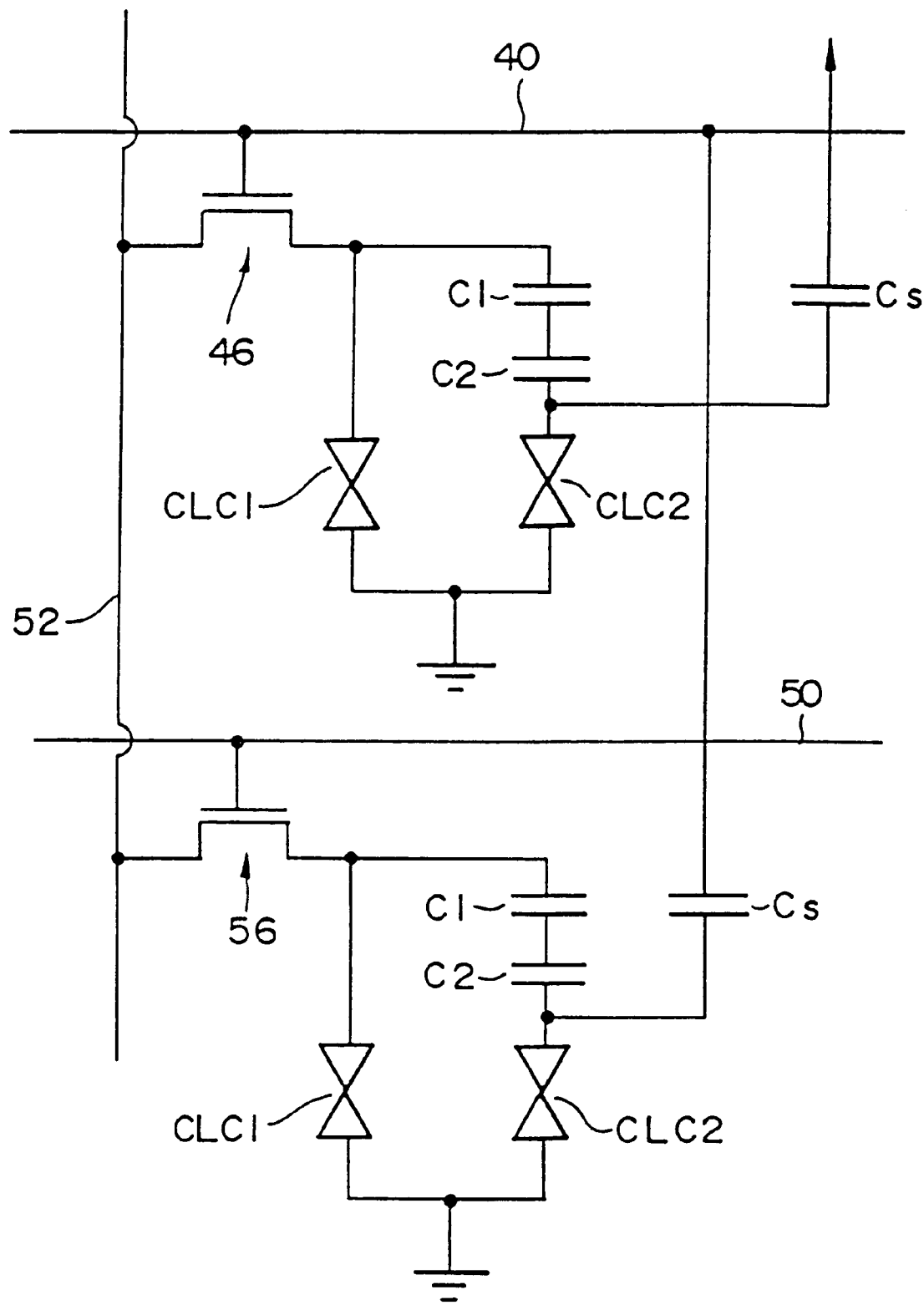
FIG. 13 is an equivalent circuit diagram of the third embodiment.

The difference from the first embodiment is the point concerning the formation of a holding capacitor CS between a scan line 40 connected to an adjacent TFT 46, and the second sub-pixel electrode 12. By having the holding capacitor CS formed, the problem of a decrease in the voltage caused by a voltage leak when the TFT 56 is off, can be solved, as is clear from the equivalent circuit diagram in FIG. 13. In that case, it is desirable if the scan line 40 which overlaps the second sub-pixel electrode 12 is a previously selected scan line (a scan line selected immediately before the scan line 50). That is, using FIG. 11 as an example, selected voltage is applied in the order of the scan lines 40 and 50. In such a way, fluctuations in voltage of the sub-pixel electrode 12, which originates in an application of selected voltage to the scan line 40, can be prevented, which can improve display characteristics. Of course, the holding capacitor electrode which overlaps the sub-pixel electrode is not limited to the scan line; the holding capacitor line can be separately formed, and this can, for example, be used for overlapping.

Figure 14:
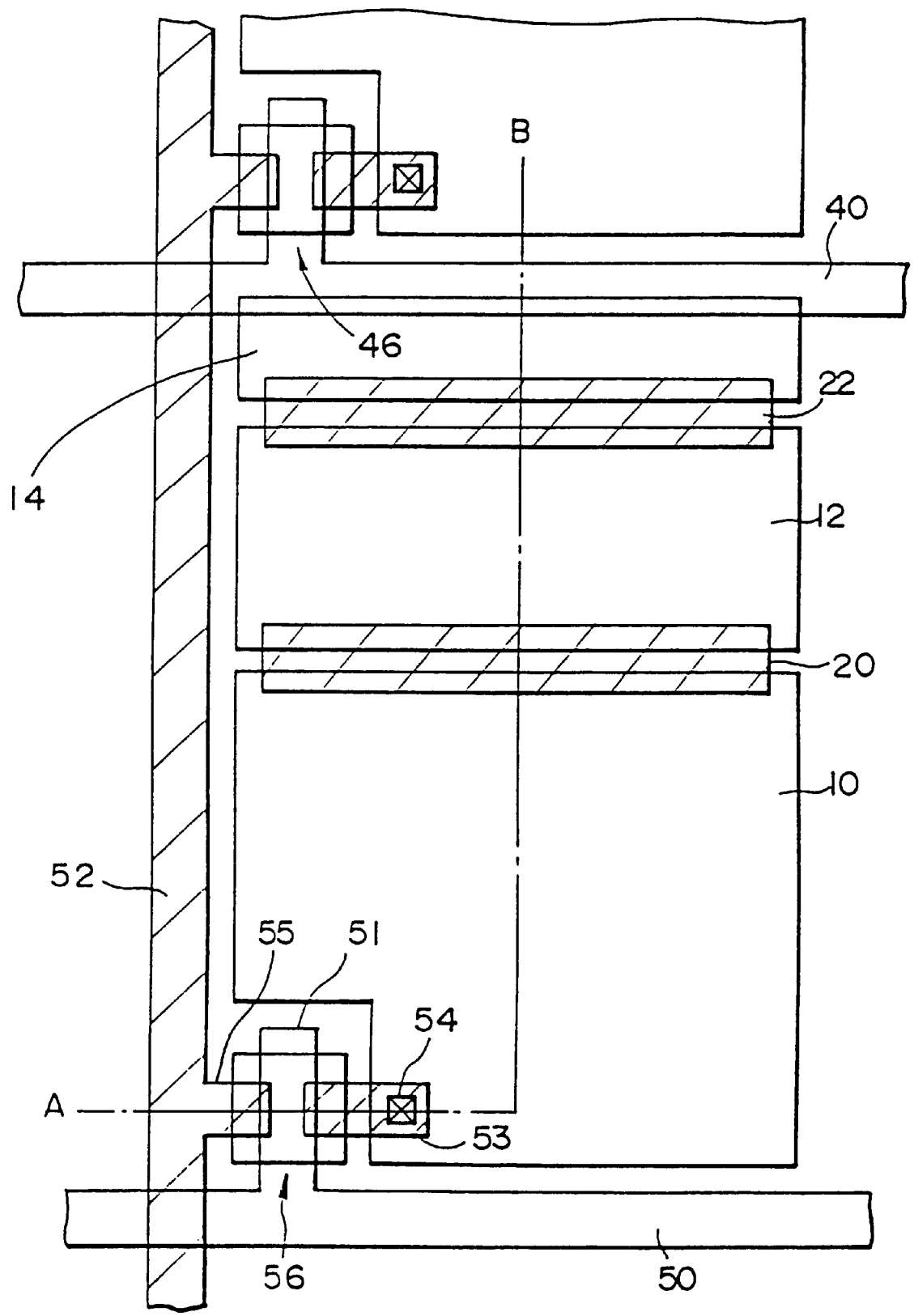
FIG. 14 shows a combination of the second embodiment and the third embodiment.

As described in the second embodiment, when the pixel electrode is additionally divided into a multiple number of sub-pixel electrodes the third sub-pixel electrode 14 and the scan line 40 are overlapped to form the holding capacitor as shown in FIG. 14, for example.

Figure 15:
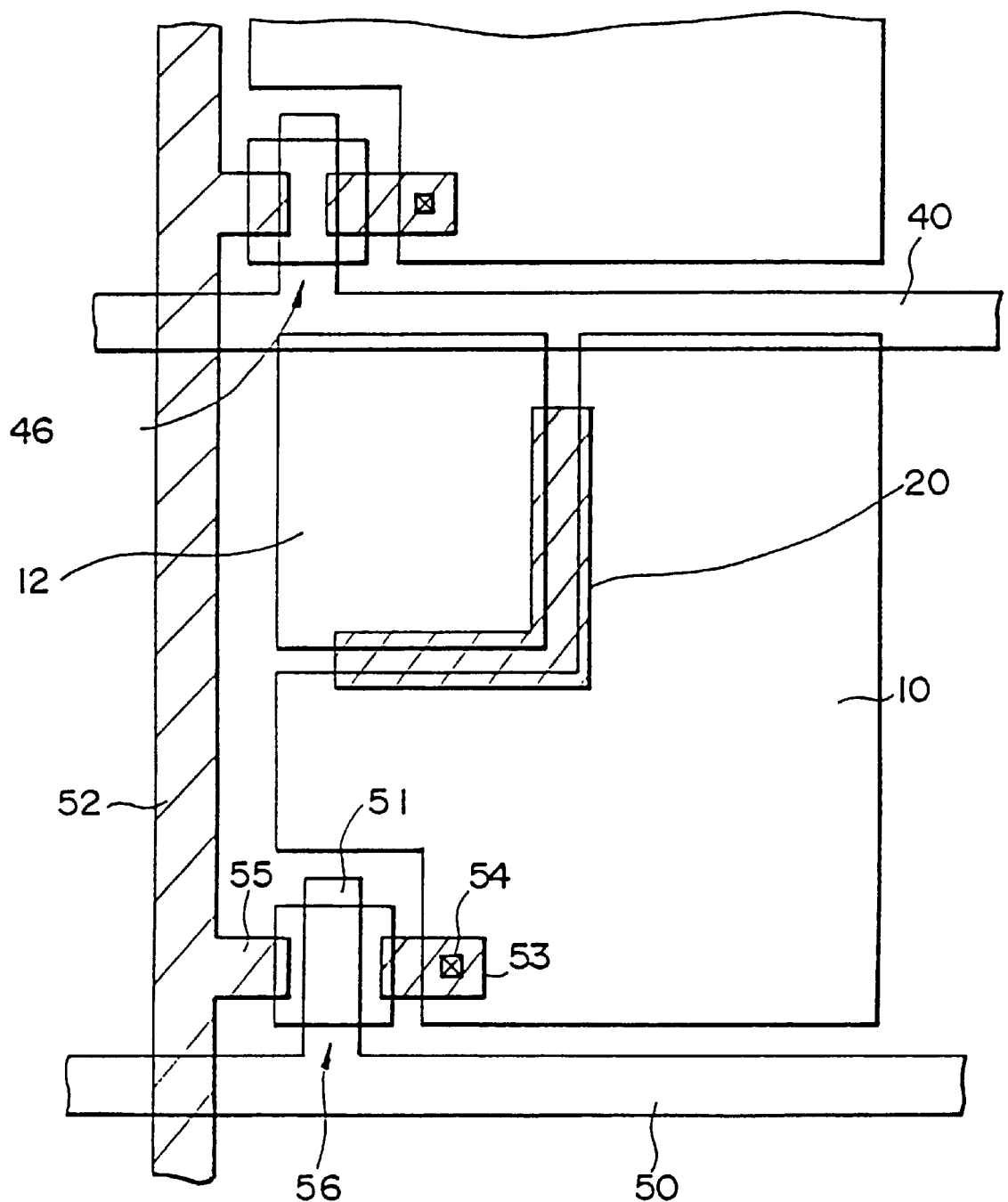
FIG. 15 shows an example of a case when a holding capacitor is formed on both the first and second sub-pixel electrodes.
Figure 16:
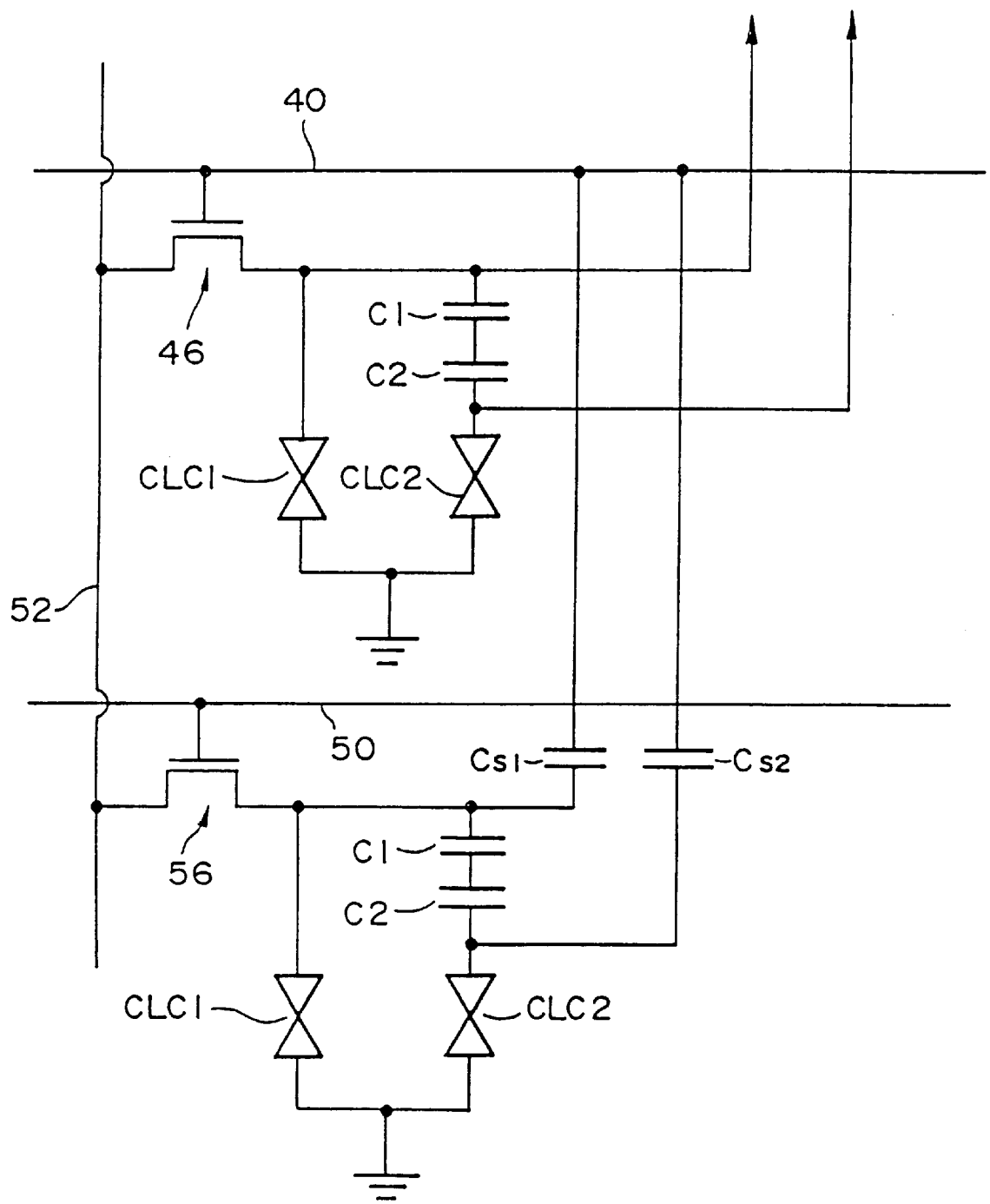
FIG. 16 is an equivalent circuit diagram of FIG. 15.

Moreover, when the holding capacitor is formed on both the first and the second sub-pixel electrodes 10 and 12, a pattern shape shown in FIG. 15 is used. Because of this (pattern), holding capacitors CS1 and CS2 can be formed as shown in an equivalent circuit in FIG. 16, and holding characteristics of voltage, which is applied not only to CLC2 but also to CLC1, can be improved. In a case where the pixel electrode is divided into three or more, holding capacitors corresponding to each sub-pixel electrode can be formed similarly to FIG. 15.

Figure 17:
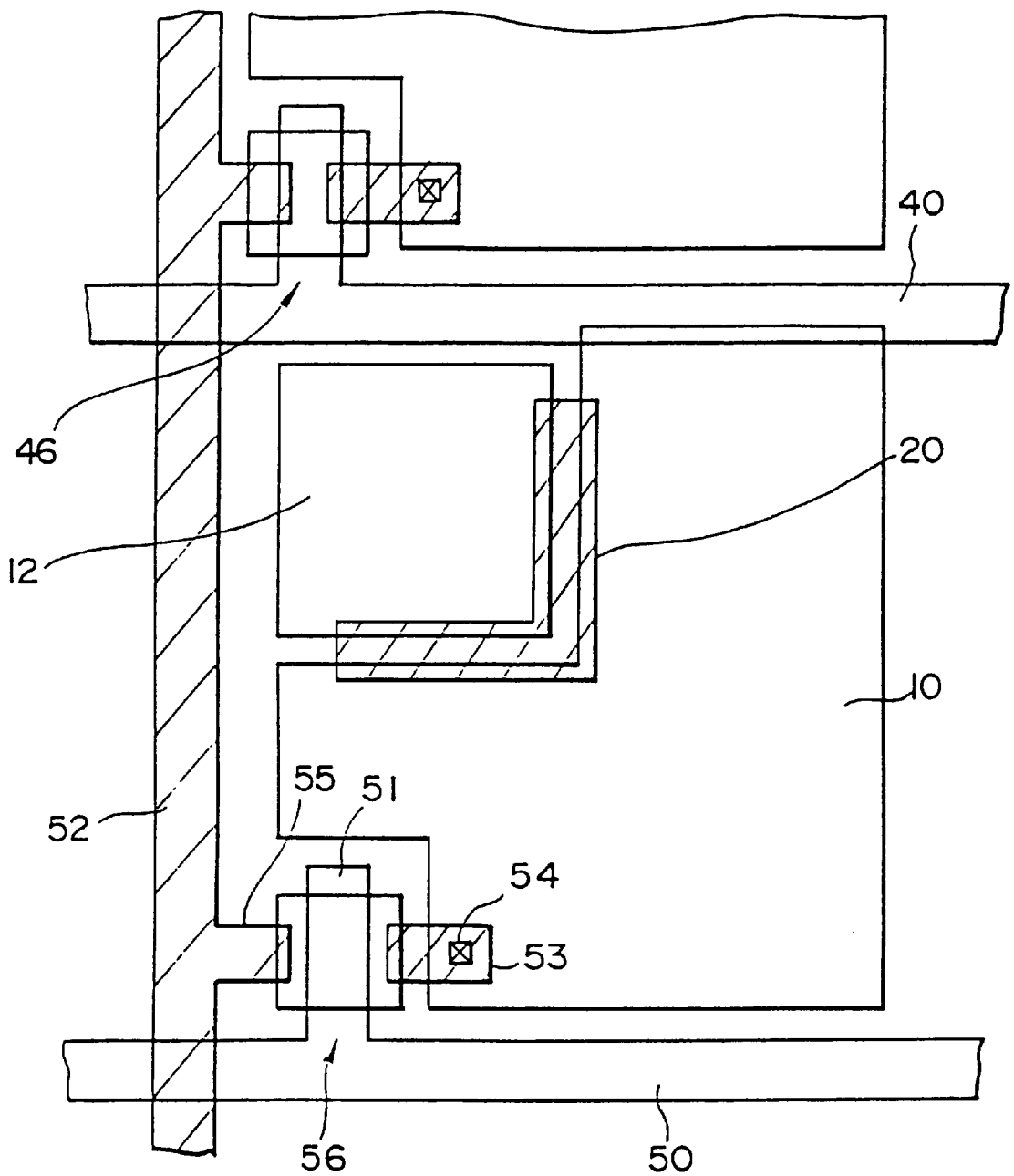
FIG. 17 shows an example of a case when the holding capacitor is formed only on the first sub-pixel electrode.
Figure 18:
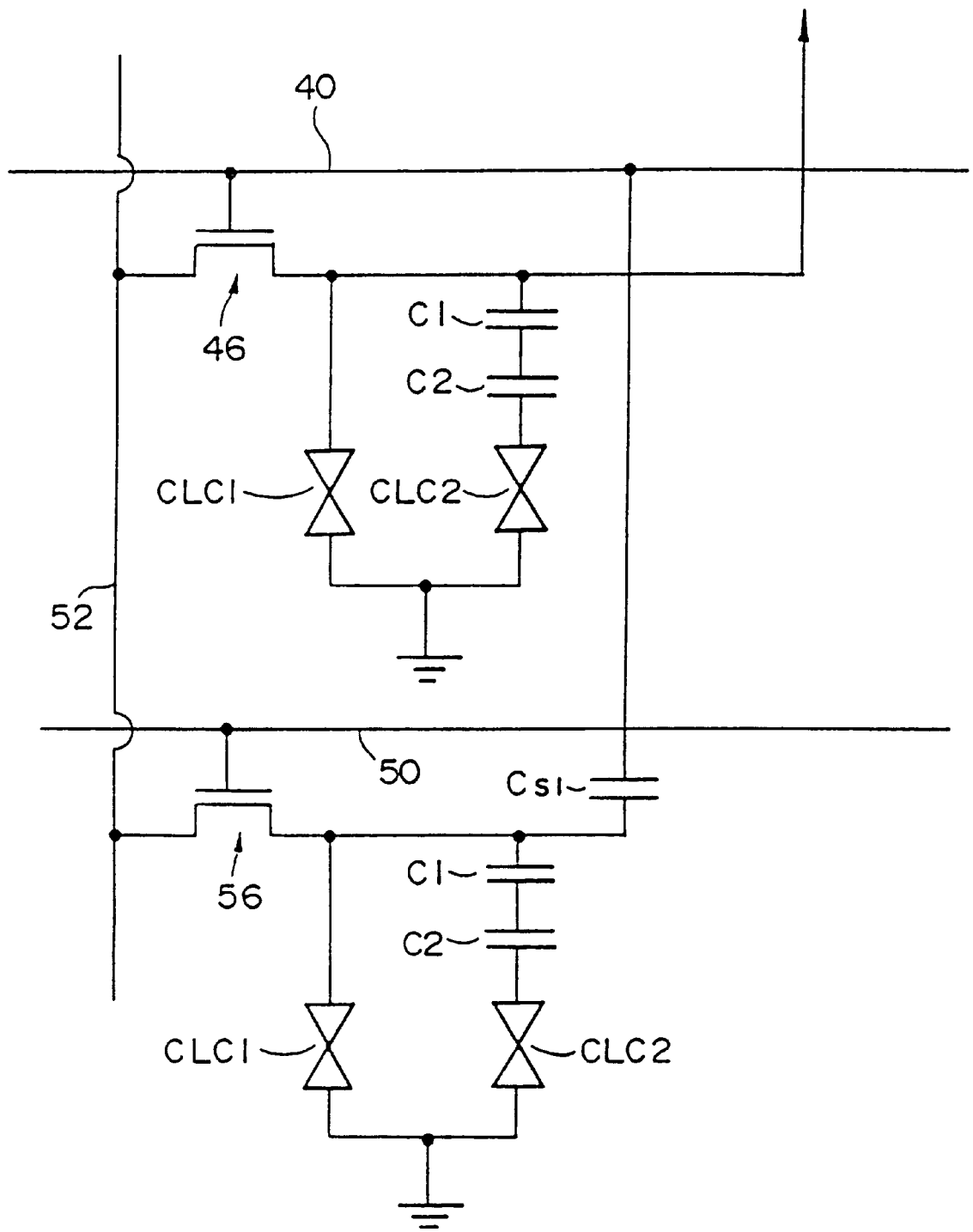
FIG. 18 is an equivalent circuit diagram of FIG. 17.

Furthermore, as shown in FIG. 17, only the first sub-pixel electrode 10 overlaps the scan line (or the holding capacitor line), for example, to form holding capacitor to only the first sub-pixel electrode. As a result, the holding capacitor CS1 can be formed as shown in an equivalent circuit in FIG. 18, and the holding characteristics of the voltage applied to CLC1, in particular, can be improved. The first sub-pixel electrode 10 is directly connected to the TFT source electrode, and providing the holding capacitor at this first sub-pixel electrode 10 is greatly effective in improving display characteristics.

As described above, according to this embodiment, with at least one of the first to the N-th sub-pixel electrodes, and a given holding capacitor electrode, the first to the J-th (J is an integer) holding capacitors can be formed. Then, if the holding capacitor is formed between two or more sub-pixel electrodes and the holding capacitor electrode, applied voltage holding characteristics of all the sub-pixel electrodes in which the holding capacitors are formed, can be improved as described above.

4. The Fourth Embodiment

Figure 19:
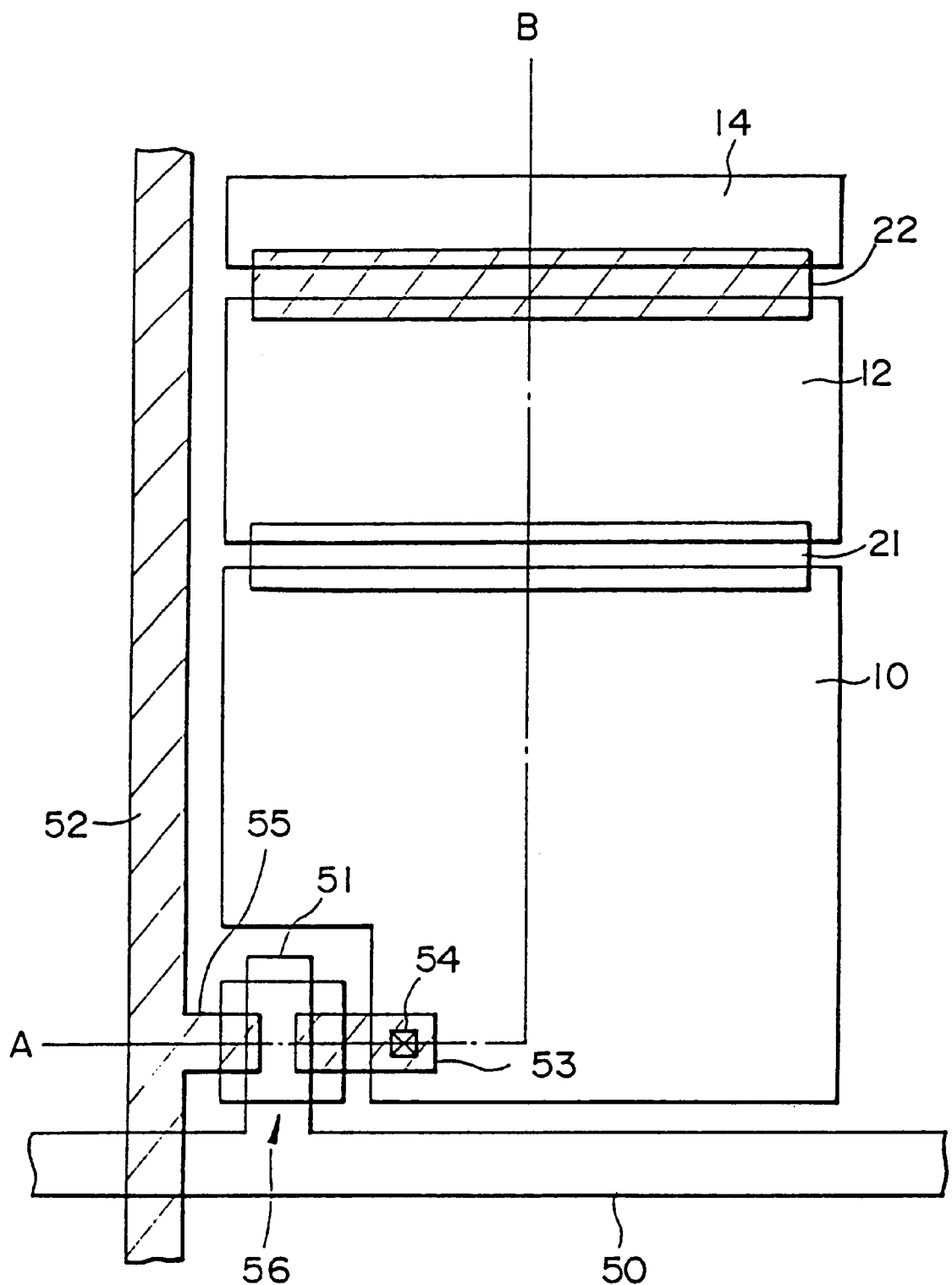
FIG. 19 shows a top view of the structure of the fourth embodiment.
Figure 20:
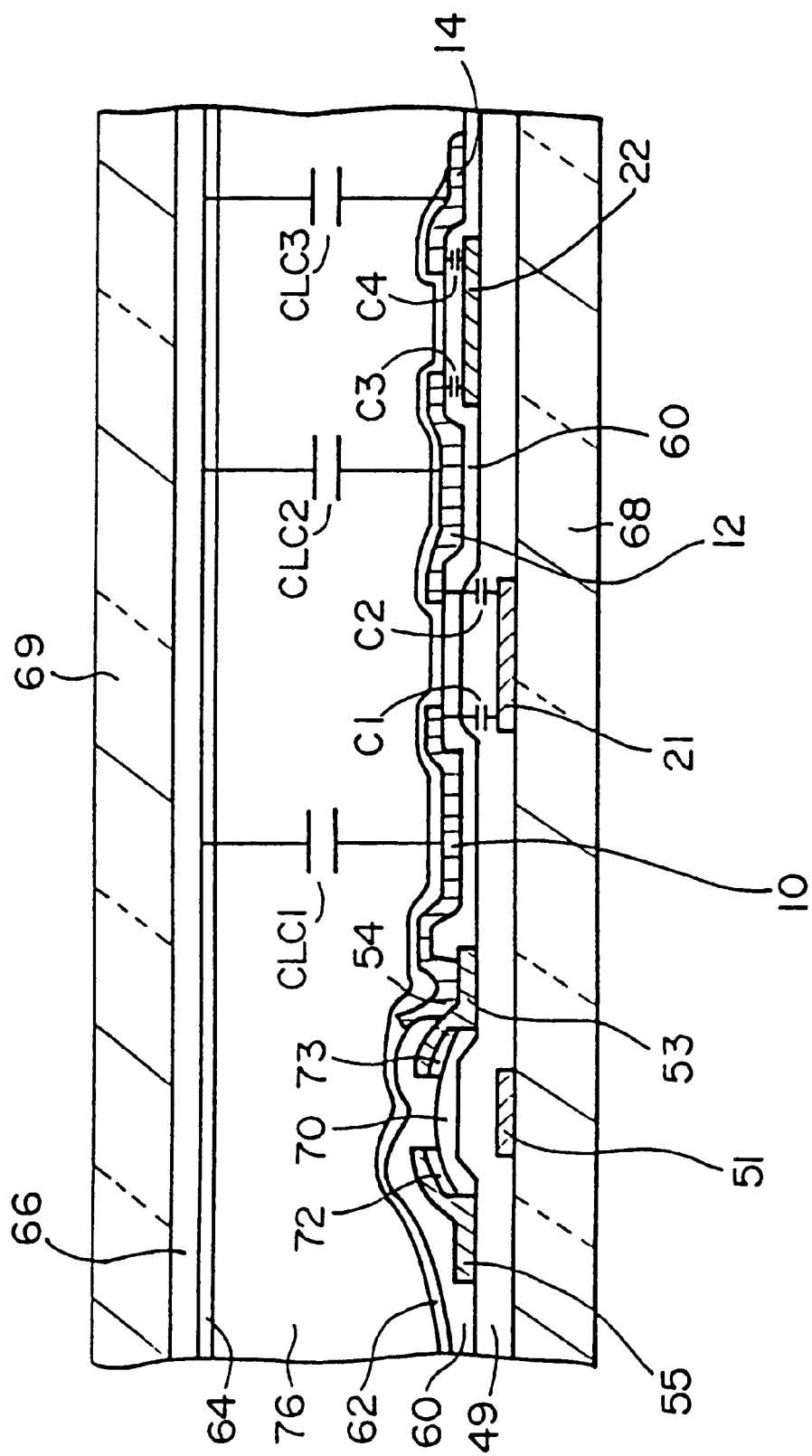
FIG. 20 is a cross section of A–B in FIG. 19.

FIG. 19 shows a top view of the structure of a liquid crystal display element related to the fourth embodiment, and FIG. 20 shows a cross section of A–B in FIG. 19.

In the fourth embodiment, as different from the second embodiment (see FIG. 9), the first control capacitor electrode 21 is provided under the gate insulating film 49. That is, the gate insulating film 49 and the like are created as dielectric, the first and second sub-pixel electrodes 10 and 12 are provided as upper electrodes, and the first control capacitor electrode 21 is provided as a lower electrode, to form the control capacitors C1 and C2. In addition, the first control capacitor electrode 21 is formed with the same process as that for the scan line 50.

According to this embodiment, the first control capacitor electrode 21 and the second control capacitor electrode 22 are formed on different layers. Because of this, occurrence of manufacturing imperfections originating in adhesive dust or the like, can be reduced. Moreover, the thickness of the dielectric body of the control capacitors C1 and C2, and the thickness of the dielectric body of the control capacitors C3 and C4, can be made differently. That is, the capacity of the control capacitors can be created differently while keeping the overlapping areas of the sub-pixel electrode and the control capacitor electrode the same. As a result, for the control capacitors in which capacity can be small, the control capacitors can be formed with the gate insulating film and the like as the dielectric body, and for the control capacitors in which capacity is required to be large, the control capacitor can be formed with the protective insulating film as the dielectric body.

In addition, in FIG. 20, the control capacitors which have gate insulating film or the like as the dielectric body are C1 and C2. However, C1 and C2 can be control capacitors which have gate insulating film or the like as the dielectric body. That is, in this embodiment, only at least one of a plurality of groups of the control capacitors C2K-1 and C2K (K being an integer) is necessary to be capacitors having gate insulating film and the like as the dielectric body.

5. The Fifth Embodiment

The fifth embodiment relates to electronic devices including liquid crystal devices having the liquid crystal display element explained in the first to the fourth embodiments.

Several example electronic devices in accordance with the invention are described using FIG. 21 through FIG. 26C.

Figure 21:
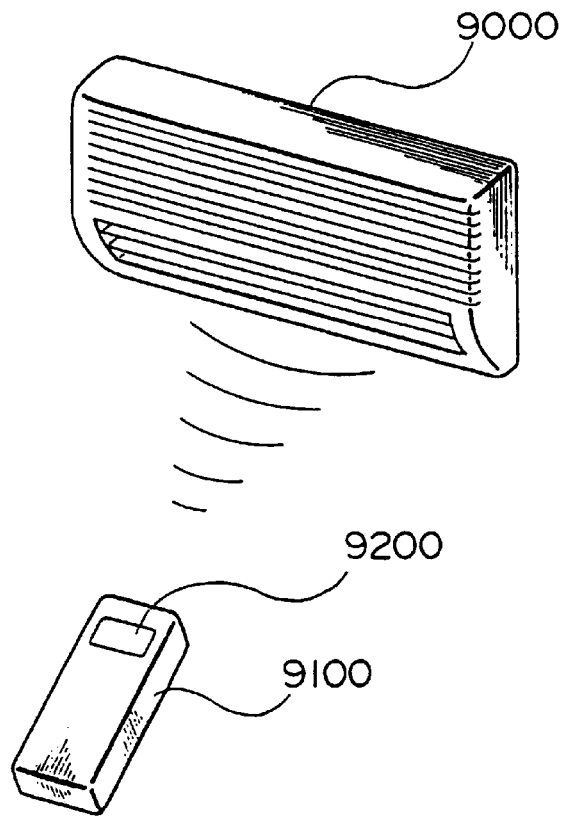
FIG. 21 shows an example of a remote controller as one of the electronic devices.

In FIG. 21, a microcomputer is built in a remote controller 9100 for an air conditioning unit. This controller 9100 controls the air conditioning 9000, and the operation status of the air conditioning and the like are displayed on a liquid crystal device (a liquid crystal panel) 9200, which can show various kinds of images.

Figure 22:
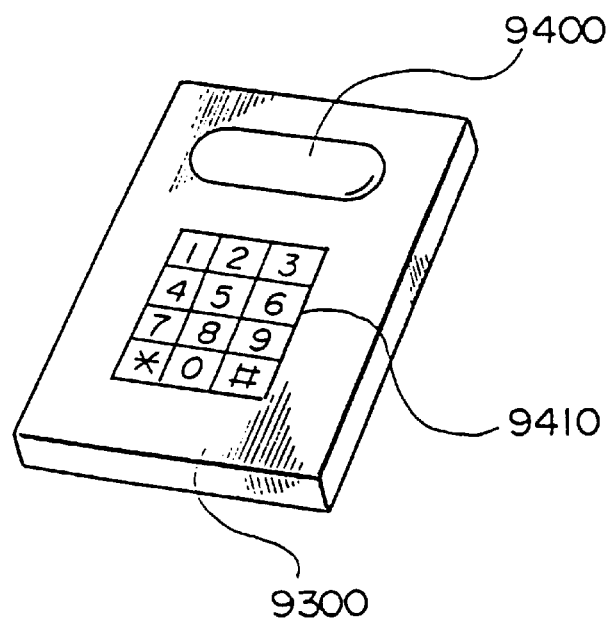
FIG. 22 shows an example of a calculator as one of the electronic devices.

In FIG. 22, the above described microcomputer is built in a calculator 9300. This calculator 9300 has input keys 9410 and a liquid crystal device 9600.

Figure 23:
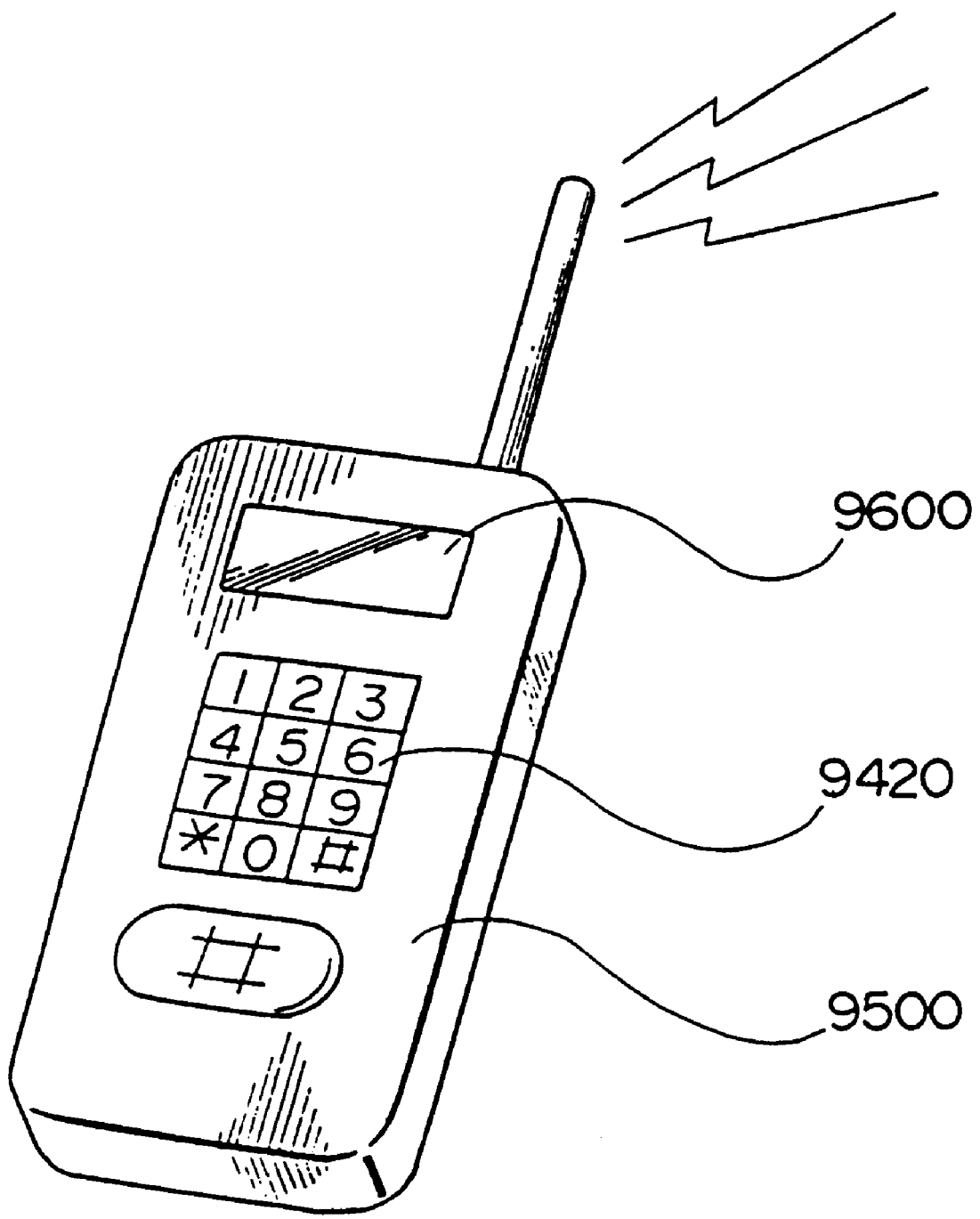
FIG. 23 shows an example of a portable phone as one of the electronic devices.

In FIG. 23, the microcomputer is built in a cellular (portable) phone 9500. This cellular phone 9500 has input keys 9420 and a liquid crystal device 9600.

The above described electronic devices are portable electronic devices using batteries (including solar power), for example. An outline of the entire structure of a control circuit of the liquid crystal device which is built in such electronic devices, is shown in FIG. 24.

Figure 24:
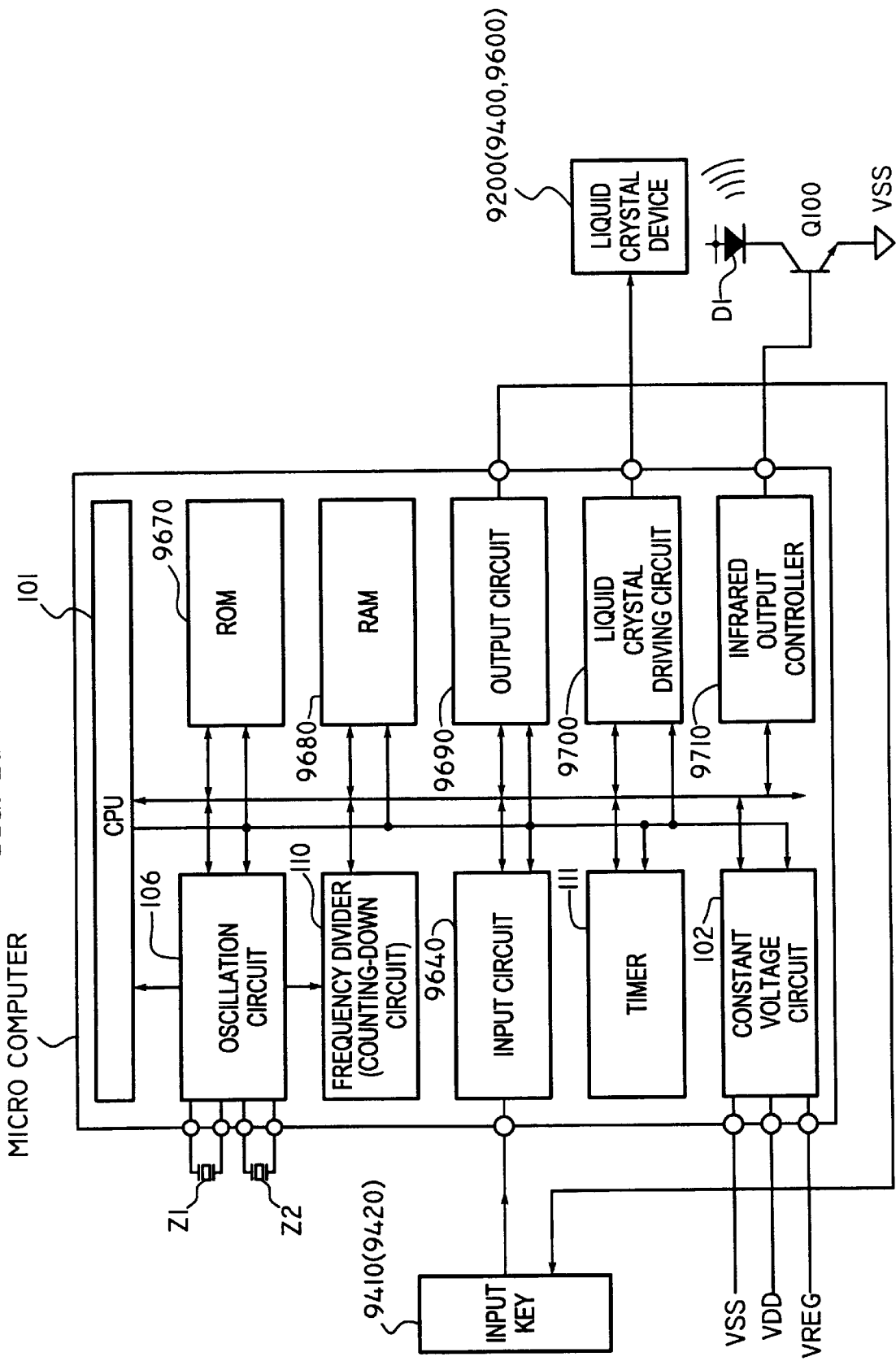
FIG. 24 shows an example of the entire structure of a control circuit of a liquid crystal device as installed in an electronic device.
Figure 26A:
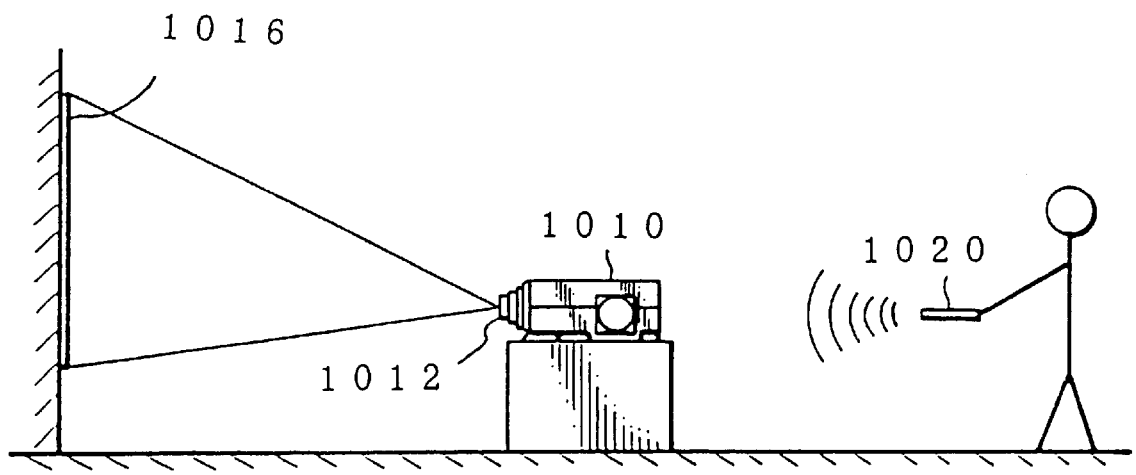
FIG. 26A–FIG. 26C show an example of a liquid crystal projector, as one of the electronic devices.
Figures 26B, 26C:
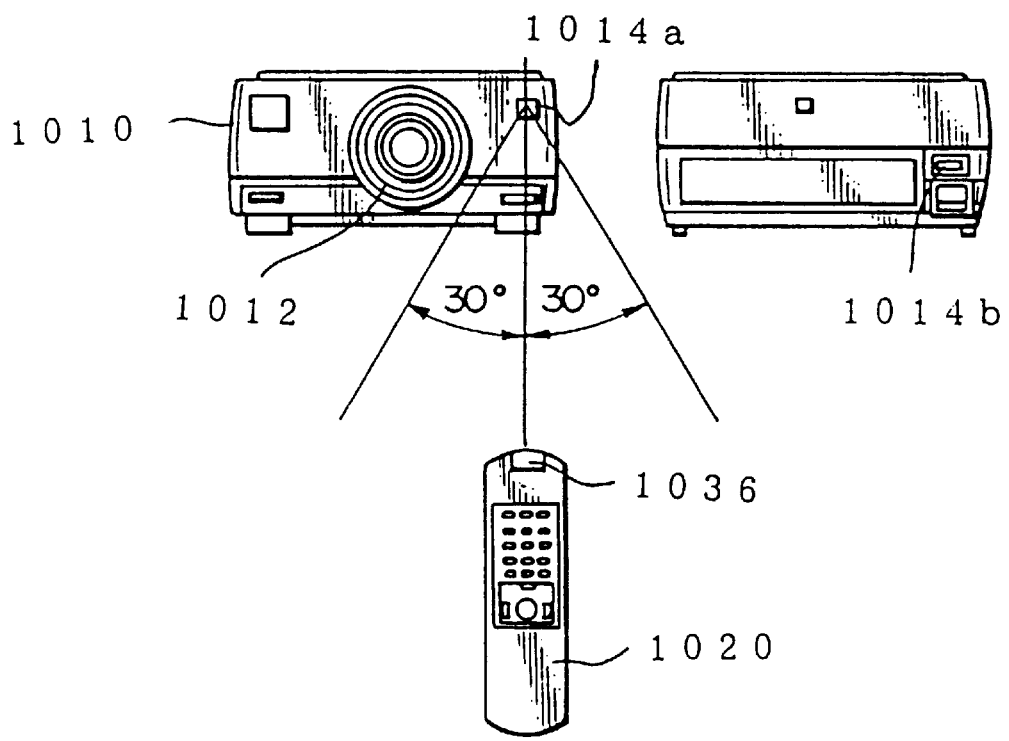

The microcomputer 9720 in FIG. 24 is built in the remote controller of the air conditioning unit shown in FIG. 21. However, it can be applied to the electronic devices shown in FIG. 22, FIG. 23, and the like.

The microcomputer 9720 shown in FIG. 24 includes a CPU 101, a constant voltage circuit 102, an oscillation circuit 106, a frequency divider 110, a timer 111, an input circuit 9640, an output circuit 9690, a ROM 9670, a RAM 9680, a liquid crystal panel driving circuit 9700, an infrared output controller 9710, and the like.

The input circuit 9640 and the output circuit 9690 are communication interface circuits between input keys 9410 and the like, for example. In addition, the liquid crystal panel driving circuit 9700 is a circuit which displays time and various kinds of status information by driving the liquid crystal device 9200 and the like. Moreover, the infrared output controller 9710 is a circuit which drives an infrared illumination diode D1 to turn on and off, through a switching transistor Q100.

Furthermore, the liquid crystal device having the liquid crystal display element described in the first to the fourth embodiments can be used in a personal portable-type data device (Personal Digital Assistance) 1000, which is one of the electronic devices.

This data device 1000 has an IC card 1100, a simultaneous translation system 1200, a screen for hand writing 1300, a TV (video) conference system 1400*a* and 1400*b*, a map (geographical) data system 1500, and a liquid crystal display screen 1660. In addition, the data device 1000 has a video camera 1610, a speaker 1620, a microphone 1630, an input pen 1640, and an earphone 1650 in an input/output interface unit 1600.

In addition, the present invention is not limited to the above described first to fifth embodiments, and any kinds of modifications are possible within the scope of the main purpose of the present invention.

For instance, the structure of the thin film transistor is not limited to the description in the above embodiments, but it can employ other structures, such as al types of inverse stagger or positive structure in an amorphous silicon thin film transistor, or planar or positive inverse stagger structures in a poly (polycrystallized) silicon thin film transistor.

In addition, the manufacturing processes for the liquid crystal display element are not limited to the ones which were described in the above embodiment, but various other methods can be employed, such as using anodic oxidation.

Moreover, a structure to form color filters, black matrices, or the like onto the TFT side substrate, is included as well.

According to the present invention, the manufacturing process is made easy while improving the visual angle characteristics, and it is possible to improve the aperture rate, and the like, as well. As a result, a high-performance, low-cost liquid crystal display element can be provided. In addition, the occurrence of manufacturing imperfections originating from adhesive dust or the like, can be prevented, resulting in improvements as to reliability and yield. Furthermore, a decrease in the maintained voltage of the sub-pixel electrodes can be prevented, which improves the display characteristics.

What is claimed is:

1. A liquid crystal display element comprising at least a thin film transistor and a pixel electrode which is connected to the thin film transistor and drives a liquid crystal layer sealed between opposing electrodes, the liquid crystal display element further comprising:

a plurality of sub-pixel electrodes formed from said pixel electrode;

a plurality of control capacitor electrodes provided under a protective insulating film, the protective insulating film for protecting source electrodes of said thin film transistor; and a plurality of control capacitors, each of the control capacitors formed from one of the sub-pixel electrodes, one of the control capacitor electrodes, and said protective insulating film, wherein adjacent ones of the control capacitors share one of the sub-pixel electrodes or one of the control capacitor electrodes, at least one of said control capacitors, through a gate insulating film provided on top of a gate electrode of said thin film transistor, being formed by the one of the sub-pixel electrodes, and a control capacitor electrode provided below said gate insulating film, and at least one of said control capacitors, through said gate insulating film, being formed by another one of the sub-pixel electrodes adjacent to the one of the sub-pixel electrodes, and by said control capacitor electrode provided below said gate insulating film.

2. The liquid crystal display element claimed in claim 1, said control capacitor electrodes being formed through the same material as said source electrodes.

3. The liquid crystal display element claimed in claim 1, wherein the thickness of said protective insulating film is thinner than that of a gate insulating film provided above a gate electrode of said thin film transistor.

4. The liquid crystal display element claimed in claim 1, said control capacitor electrodes becoming a part of a black matrix which becomes a light blockage layer.

5. The liquid crystal display element claimed in claim 1, wherein said one of the control capacitor electrodes is formed such that a part of the region of a gap between said one of the sub-pixel electrodes and another one of the sub-pixel electrodes adjacent to the one of the sub-pixel electrodes is covered, and formed such that the one of the control capacitor electrode is distant from other electrodes which are formed on the same layer as said one of the control capacitor electrodes.

6. The liquid crystal display element claimed in claim 1, further comprising at least one holding capacitor, formed through a holding capacitor electrode.

7. The liquid crystal display element claimed in claim 6, including a first of the holding capacitor formed by a first of the sub-pixel electrodes connected to the source electrode of said thin film transistor, and formed by the holding capacitor electrode.

8. The liquid crystal display element claimed in claim 6, wherein said at least one holding capacitor electrode is a scan line connected to an adjacent thin film transistor.

9. The liquid crystal display element claimed in claim 6, wherein said holding capacitor electrode is a scan line connected to an adjacent thin film transistor.

10. An electronic device including a liquid crystal device having the liquid crystal display element claimed in claim 1.

11. A manufacturing method of the liquid crystal display element, including at least a thin film transistor, and, connected to said thin film transistor, a pixel electrode driving the liquid crystal layer sealed between it and an opposing electrode, the manufacturing method for the liquid crystal display element, including the steps of:

(A) forming a plurality of control capacitor electrodes;

(B) forming a protective insulating film, for protecting a source electrode of said thin film transistor, on the top of the control capacity electrodes;

(C) forming a plurality of sub-pixel electrodes by dividing said pixel electrode; and (D) forming each of a plurality of control capacitors, from one of the sub-pixel electrodes, one of the control capacitor electrodes, and the protective insulating film, wherein adjacent ones of the control capacitors share one of the sub-pixel electrodes or one of the control capacitor electrodes, at least one of said control capacitors, through a gate insulating film provided on top of a gate electrode of said thin film transistor, is formed by the one of the sub-pixel electrodes, and a control capacitor electrode provided below said gate insulating film, and at least one of said control capacitors, through said gate insulating film, is formed by another one of the sub-pixel electrodes adjacent to the one of the sub-pixel electrodes, and by said control capacitor electrode provided below said gate insulating film.

12. The manufacturing method of the liquid crystal display element claimed in claim 11, said control capacitor electrodes being formed by a process identical to that for said source electrodes.

13. The manufacturing method of the liquid crystal display element claimed in claim 11, wherein:

in said step (B), the thickness of said protective insulating film is formed as even thinner than the gate insulating film formed on top of the gate electrode of said thin film transistor.

* * * * *